(12) United States Patent
Nguyen et al.

(10) Patent No.: US 9,803,099 B2
(45) Date of Patent: Oct. 31, 2017

(54) CARBON BLACK FOR WATERBORNE COATINGS

(71) Applicant: Cabot Corporation, Boston, MA (US)

(72) Inventors: Lang H. Nguyen, Lowell, MA (US); Qingling Zhang, Bloomfield Hills, MI (US); Lynne K. LaRochelle Richard, Littleton, MA (US)

(73) Assignee: Cabot Corporation, Boston, MA (US)

( * ) Notice: Subject to any disclaimer, the term of this patent is extended or adjusted under 35 U.S.C. 154(b) by 61 days.

(21) Appl. No.: 14/899,906

(22) PCT Filed: Jul. 10, 2014

(86) PCT No.: PCT/US2014/046244
§ 371 (c)(1),
(2) Date: Dec. 18, 2015

(87) PCT Pub. No.: WO2015/006620
PCT Pub. Date: Jan. 15, 2015

(65) Prior Publication Data
US 2016/0137866 A1    May 19, 2016

Related U.S. Application Data

(60) Provisional application No. 61/845,901, filed on Jul. 12, 2013, provisional application No. 61/931,511, filed on Jan. 24, 2014, provisional application No. 61/954,360, filed on Mar. 17, 2014.

(51) Int. Cl.
| | |
|---|---|
| *C08K 9/00* | (2006.01) |
| *C09D 17/00* | (2006.01) |
| *C09D 133/10* | (2006.01) |
| *C09D 167/08* | (2006.01) |

(52) U.S. Cl.
CPC ......... *C09D 17/005* (2013.01); *C09D 133/10* (2013.01); *C09D 167/08* (2013.01)

(58) Field of Classification Search
CPC ... C09D 17/005; C09D 133/10; C09D 167/08
See application file for complete search history.

(56) References Cited

U.S. PATENT DOCUMENTS

| | | | |
|---|---|---|---|
| 5,630,868 A | 5/1997 | Belmont et al. | |
| 5,885,335 A | 3/1999 | Adams et al. | |
| 8,927,648 B2 * | 1/2015 | Zhang | C08G 63/91 523/200 |
| 9,150,739 B2 * | 10/2015 | Sanchez Garcia | C09C 1/56 |
| 9,238,736 B2 * | 1/2016 | Kyrlidis | B82Y 30/00 |
| 2003/0101910 A1 | 6/2003 | Godwin et al. | |
| 2008/0087191 A1 * | 4/2008 | Shim | C09B 67/0013 106/31.25 |
| 2008/0159947 A1 * | 7/2008 | Yurovskaya | C09C 1/50 423/449.2 |
| 2012/0092598 A1 | 4/2012 | Kyrlidis et al. | |

FOREIGN PATENT DOCUMENTS

| | | |
|---|---|---|
| WO | WO 96/18695 | 6/1996 |
| WO | WO 97/47691 | 12/1997 |
| WO | WO 97/47692 | 12/1997 |
| WO | WO 2012/051264 A1 | 4/2012 |

OTHER PUBLICATIONS

Transmittal of the International Search Report and the Written Opinion of the International Searching Authority, or the Declaration of International Application No. PCT/US2014/046244, dated Jan. 27, 2015.

* cited by examiner

*Primary Examiner* — Hannah Pak

(57) ABSTRACT

An aqueous carbon black millbase, an aqueous carbon black liquid coating, and a method of making the millbase and liquid coating are provided. The carbon blacks are modified carbon blacks that are engineered to be able to be stirred into an aqueous vehicle without high energy milling of the carbon black. The modified carbon blacks include low organic treatment levels and the millbase and liquid coating do not require large quantities of dispersant. The resulting coatings exhibit excellent viscosity, color, hiding power and stability.

23 Claims, 7 Drawing Sheets

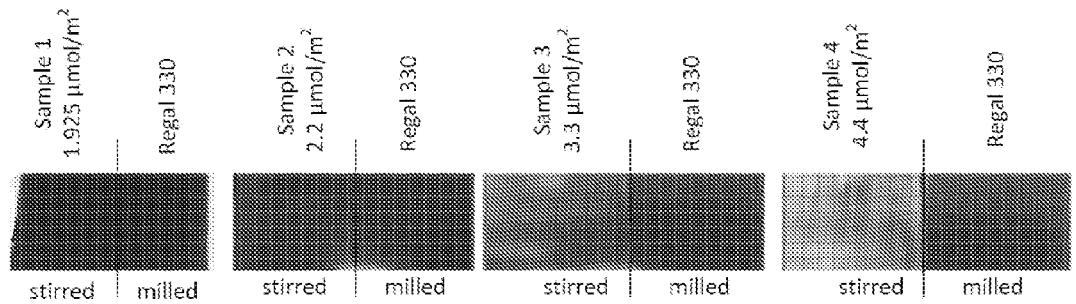
FIG. 1
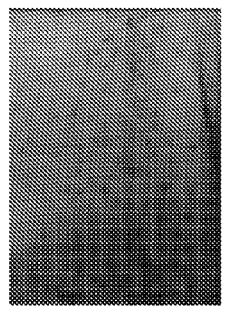
FIG. 2
FIG. 3
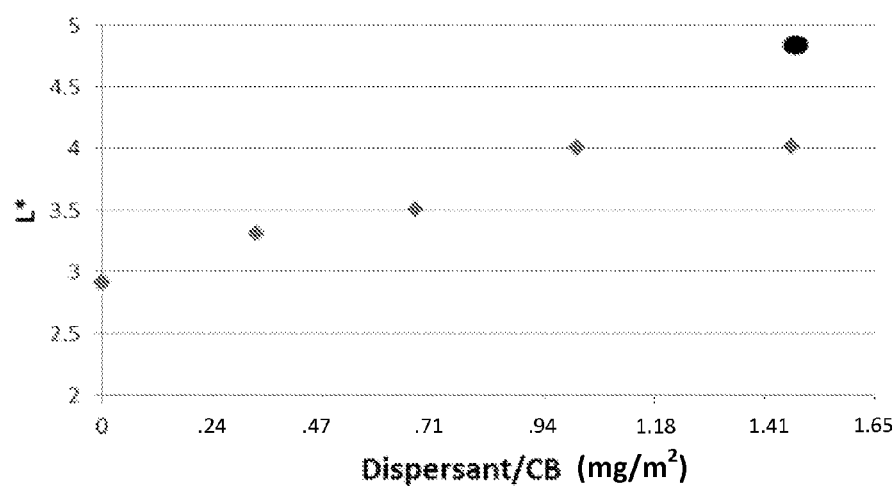

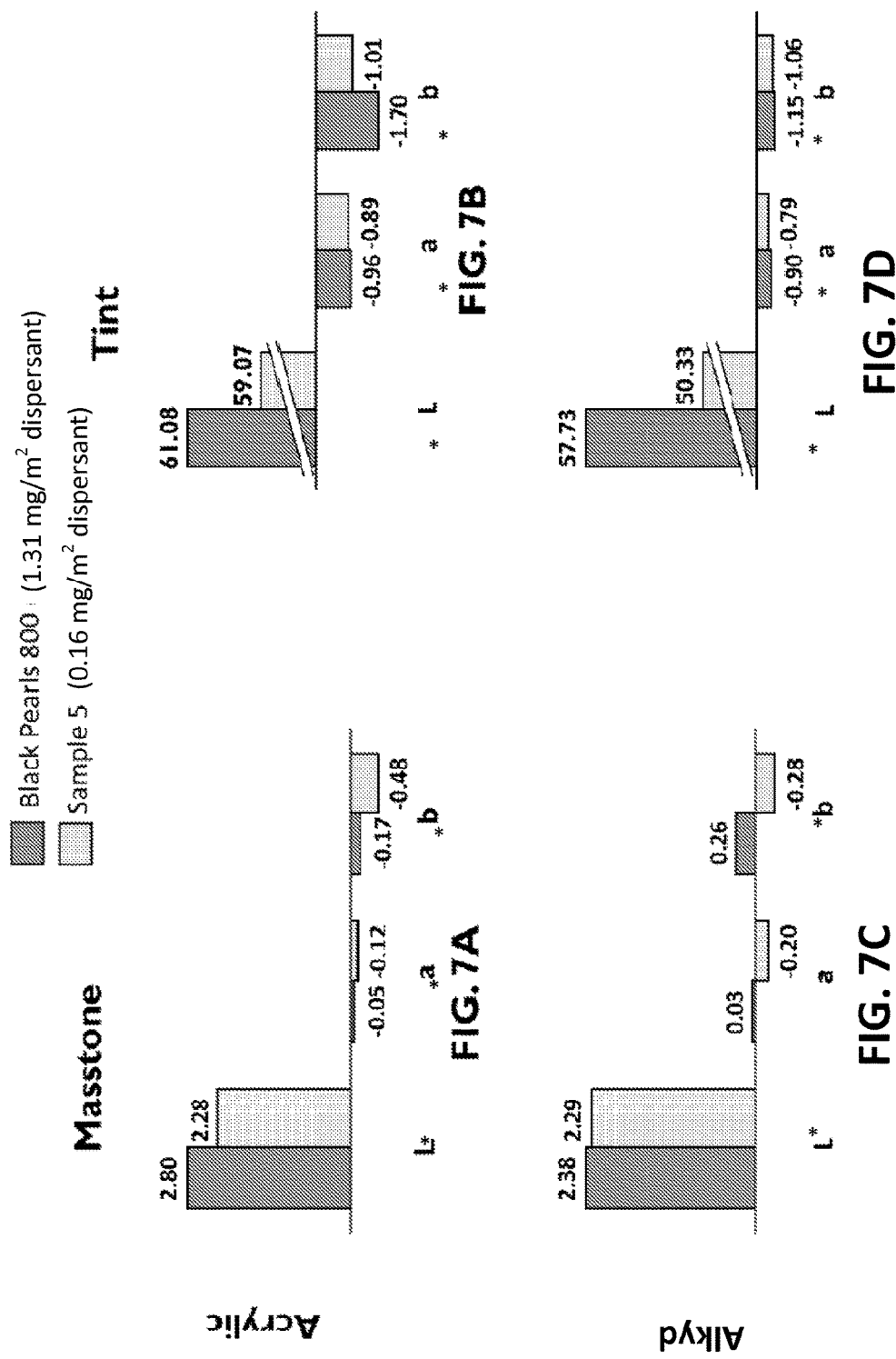
FIGS. 7A-7D Masstone and tint formulations in acrylic and alkyd coatings

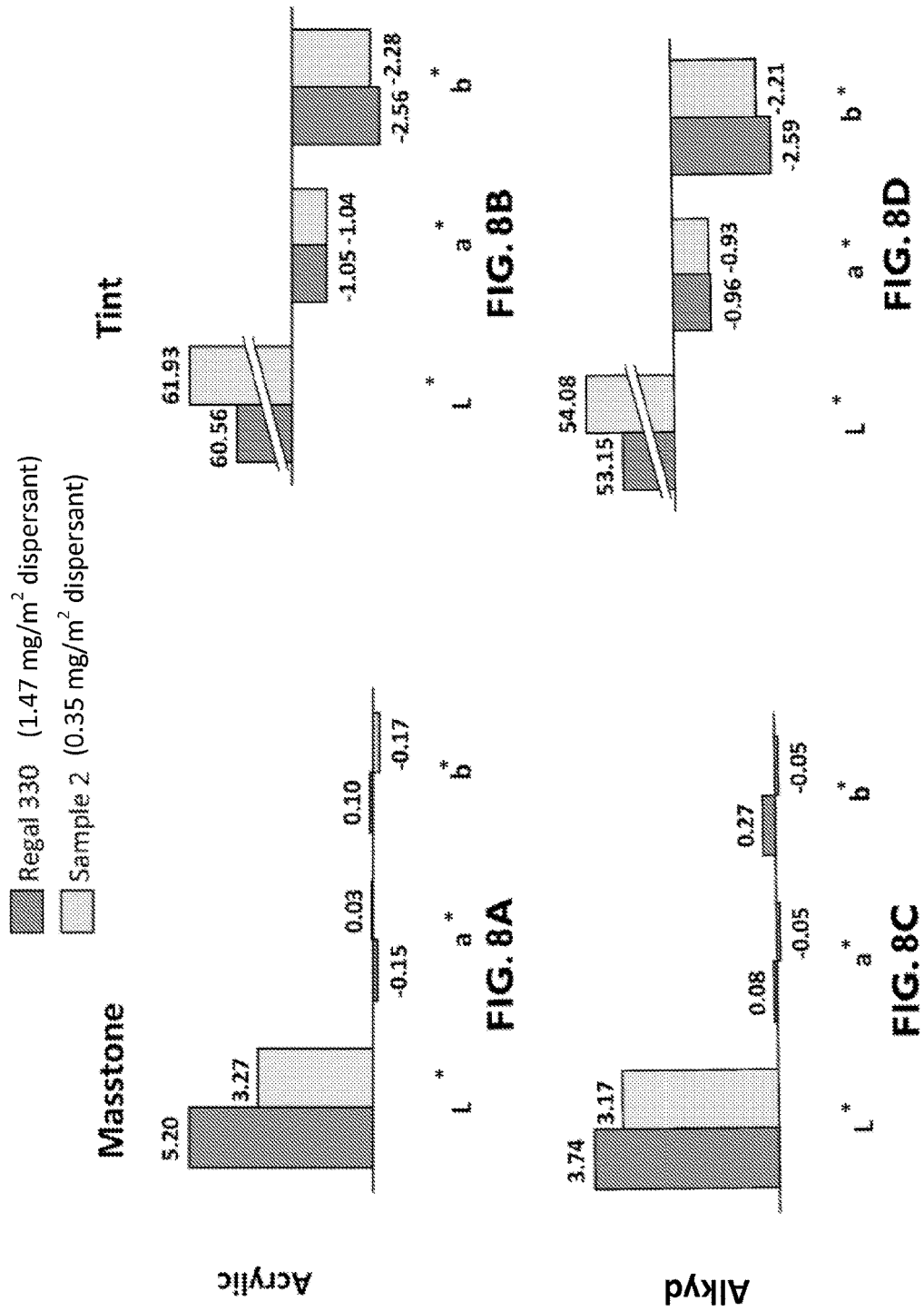
FIGS. 8A-8D Masstone and tint formulations in acrylic and alkyd coatings

FIGS. 9A-9D Masstone and tint formulations in acrylic and alkyd coatings

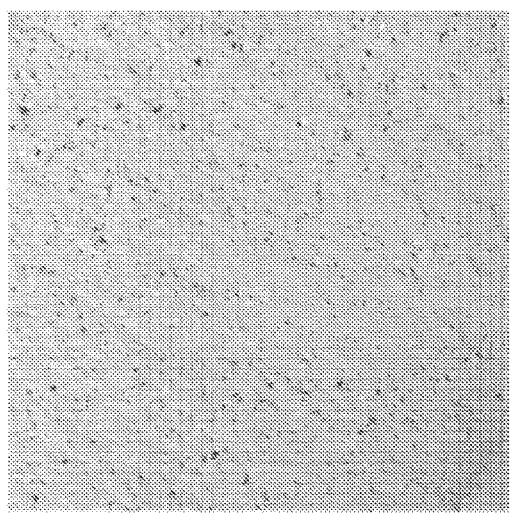 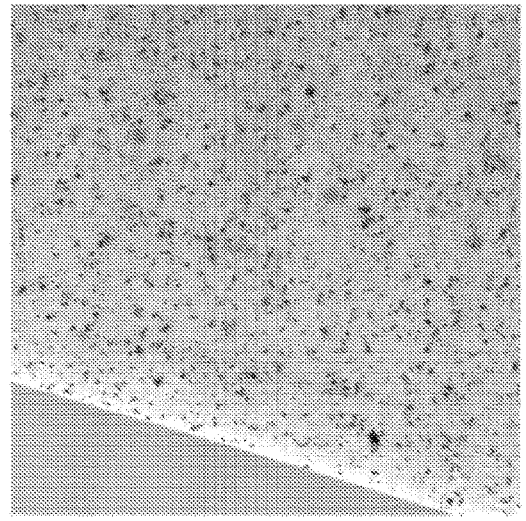
FIG. 10A  FIG. 10B
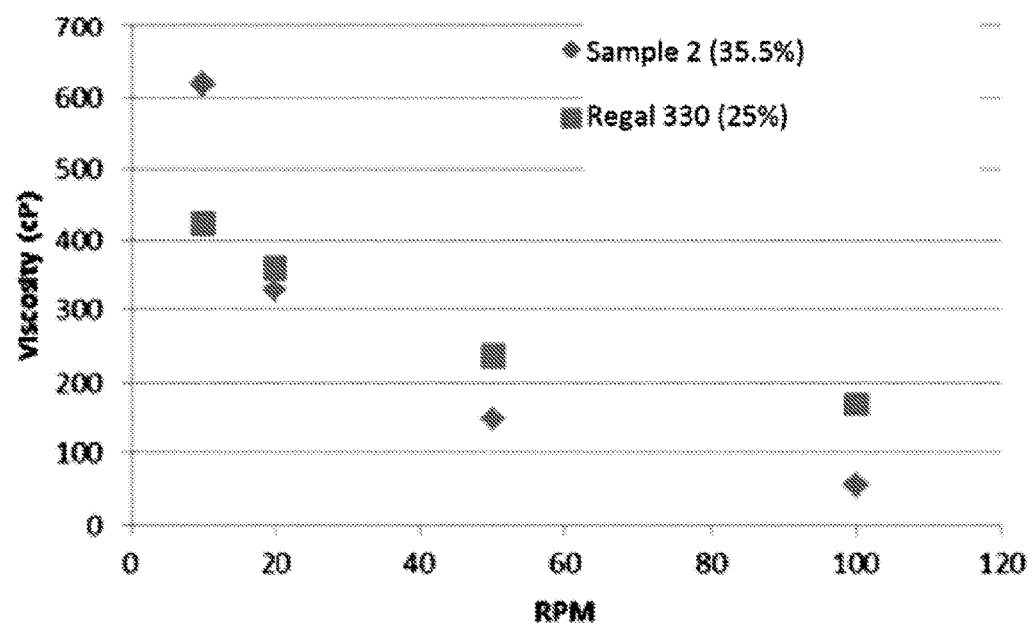
FIG. 11

CARBON BLACK FOR WATERBORNE COATINGS

FIELD OF THE DISCLOSURE

The present disclosure relates to carbon blacks and, in particular, to waterborne coatings and millbases incorporating modified carbon blacks.

BACKGROUND

Carbon black pigments are used in a number of fields, including inks, coatings, toners, adhesives, pipes, cables and color filters. In many cases, carbon blacks are dispersed in a liquid vehicle that can be either aqueous or non-aqueous. Carbon blacks can be treated with different materials to render them more readily dispersible in either aqueous or non-aqueous systems.

SUMMARY

In one aspect, a millbase dispersion is provided, the millbase dispersion comprising an aqueous solvent comprising greater than 90% water by weight, at least 30% by weight of a modified carbon black, the modified carbon black having an STSA between 20 and 300 m$^2$/g as measured prior to treatment, the modified carbon black modified with a treating agent comprising an organic group and an ionic or ionizable group at a treating agent concentration of between 1.5 and 3.0 µmol/m$^2$, a dispersant concentration of less than 2.0 mg per square meter of carbon black surface area as measured by STSA prior to treatment, and wherein less than 10% by volume of the carbon black dispersed in the millbase has a particle size of greater than 0.5 µm. When tested using Aqueous Coatings Evaluation Method A described herein, the resulting cured coating can exhibit a hiding power of greater than or equal to 0.98 at a wet film thickness of about 0.076 mm. The carbon black can also be treated at a treating agent concentration of from 1.5 to 3.5, from 1.5 to 2.5, or from 1.5 to 2 µmol/m$^2$. A coating of 1 to 5% modified carbon black by weight made from the millbase can have a hiding power of greater than or equal to 0.95, 0.97, 0.98 or 0.99 and can be obtained after the millbase dispersion has been aged for one week at an elevated temperature, e.g., 52° C. The millbase dispersion can include modified carbon black particles having an average primary particle size of from 15-50 nm, and the modified carbon black particles can be treated with an agent comprising an aryl group, a sulfonic acid group or salts thereof, a benzoic acid group or salts thereof, a carboxylic acid group or salts thereof or a phosphonic acid group or salts thereof. The dispersant can be a nonionic dispersant, and the millbase can comprise an alkyd or acrylic resin. The treating agent can be directly attached to the carbon black. The millbase can exhibit a Brookfield viscosity of less than 700, less than 650, less than 600 or less than 550 cP at 10 rpm and 25° C.

In another aspect, a carbon black millbase dispersion is provided, the millbase dispersion comprising an aqueous solvent comprising at least 90% water by weight, greater than 30% modified carbon black by weight, the modified carbon black treated with a treatment compound at a treatment level of between 1 and 3.5 µmol/m$^2$, the organic treatment compound comprising both an aryl group and an ionic or ionizable group, the modified carbon black made from an untreated carbon black having an STSA of greater than 20 m$^2$/g and less than 300 m$^2$/g and less than or equal to 2.4 mg of dispersant per square meter of carbon black surface area. The carbon black millbase dispersion can remain stably dispersed after one week at 52° C. The surface area of the untreated carbon black can also be less than 250, less than 200 or less than 150 m$^2$/g. The millbase can include greater than or equal to 20, 30 or 40% modified carbon black by weight and can also include greater than or equal to 0.1, 0.2, 0.5, 1.0 or 1.5 g of dispersant per square meter of carbon black surface area. The millbase may also include less than 3.5, less than 3.0, less than 2.5, less than 2.0, less than 1.5, less than 1.0, less than 0.8, less than or equal to 0.5 or less than 0.5 mg of dispersant per square meter of carbon black surface area. The unmodified carbon black can have a surface area (STSA) of less than 350, less than 300, less than 250, less than 200 or less than 150 m$^2$/g. The millbase can be produced without ball milling and can be mixed into the aqueous vehicle using a blade tip speed that does not exceed 2 m/s, 3 m/s or 4.2 m/s. The millbase may have a dispersant concentration in mg per square meter of carbon black surface area in the range of $(1.5(x-2)^2+0.6)+/-0.5$ where x equals the treatment level in µmol/m$^2$.

In another aspect, a carbon black millbase dispersion is provided, the millbase comprising greater than or equal to 30% of a modified carbon black and less than 2.4 mg of dispersant per square meter of carbon black surface area, the modified carbon black treated with a treating agent at a level of less than or equal to 2.0 µmol/m$^2$, the millbase comprising an aqueous solvent that includes at least 90% water, and wherein the sum of the treatment level in µmol/m$^2$ and the dispersant level in mg/m$^2$ is greater than or equal to 2.5. The carbon black millbase dispersion can remain stably dispersed after one week at 52° C. The surface area of the untreated carbon black can also be less than 250, less than 200 or less than 150 m$^2$/g. The millbase can include greater than or equal to 20, 30 or 40% modified carbon black by weight and can also include greater than or equal to 0.1, 0.2, 0.5, 1.0 or 1.5 g of dispersant per square meter of carbon black surface area. The millbase may also include less than 3.5, less than 3.0, less than 2.5, less than 2.0, less than 1.5, less than 1.0, less than 0.8, less than or equal to 0.5 or less than 0.5 mg of dispersant per square meter of carbon black surface area. The unmodified carbon black can have a surface area (STSA) of less than 350, less than 300, less than 250, less than 200 or less than 150 m$^2$/g. The millbase can be produced without ball milling and can be mixed into the aqueous vehicle using a blade tip speed that does not exceed 2 m/s, 3 m/s or 4.2 m/s. The millbase may have a dispersant concentration in mg per square meter of carbon black surface area in the range of $(1.5(x-2)^2+0.6)+/-0.5$ where x equals the treatment level in µmol/m$^2$.

In another aspect, a method of making a stable aqueous liquid coating is provided, the method comprising mixing undispersed carbon black powder into an aqueous coating letdown vehicle at a carbon black loading of greater than 0.0001% by weight and less than 5% by weight of the stable aqueous liquid coating, the stable aqueous liquid coating having a dispersant concentration of less than 2.4 mg per square meter of carbon black surface area, and wherein the liquid coating exhibits a hiding power of greater than or equal to 0.98 at a wet film thickness of 0.0762 mm and wherein the undispersed carbon black powder is capable of being dispersed by stirring the carbon black into the aqueous letdown vehicle while not exceeding a blade tip speed of 4 m/s. The method may be done in the absence of ball milling or grinding and the mixing step can use less than 100 watts or less than 50 watts per 200 g of aqueous liquid coating. The coating can comprise greater than 50% aqueous resin by weight, and the resin can be a latex and can be an acrylic or alkyd resin. The method can use a modified carbon black treated with an organic group including a sulfonic acid group or salts thereof, a carboxylic acid group or salts thereof, a benzoic acid group or salts thereof, or a phosphonic acid group or salts thereof. The modified carbon black can have an STSA surface area greater than 20 $m^2/g$ and less than 300 $m^2/g$, greater than 20 $m^2/g$ and less than 250 $m^2/g$, or greater than 20 $m^2/g$ and less than 200 $m^2/g$. The modified carbon black can include greater than 1.0, 1.5 or 2.0 $\mu mol/m^2$ and less than 3.5, 3.0 or 2.5 $\mu mol/m^2$ of a treating agent comprising an organic group that includes an ionic or ionizable group.

In another aspect, a method of making an aqueous millbase dispersion is provided, the method comprising stirring an undispersed modified carbon black dry powder without milling media into an aqueous vehicle at a concentration of at least 30% by weight, based on the final weight of the millbase, to form a carbon black millbase, the modified carbon black treated with a treating agent at a loading between 1.0 and 3.0 $\mu mol/m^2$, the treating agent comprising an aryl group and an ionic or ionizable group, the aqueous vehicle comprising a solvent that includes greater than 90% water by weight and less than 2.4 mg of dispersant per square meter of carbon black surface area, and wherein fewer than 10% by volume of the carbon black particles dispersed in the millbase have a particle size of greater than 0.5 $\mu m$. The method may be completed in the absence of ball milling or grinding and the stirring step can use less than 100 watts or less than 50 watts per 200 g of aqueous liquid coating. The method can use a modified carbon black treated with an organic group including a sulfonic acid group or salts thereof, a carboxylic acid group or salts thereof, a benzoic acid group or salts thereof, or a phosphonic acid group or salts thereof. The modified carbon black can have an STSA surface area greater than 20 $m^2/g$ and less than 300 $m^2/g$, greater than 20 $m^2/g$ and less than 250 $m^2/g$, or greater than 20 $m^2/g$ and less than 200 $m^2/g$. The modified carbon black can include greater than 1.0, 1.5 or 2.0 $\mu mol/m^2$ and less than 3.5, 3.0 or 2.5 $\mu mol/m^2$ of a treating agent comprising an organic group that includes an ionic or ionizable group. The carbon black can be dispersed at a concentration of greater than or equal to 40% by weight. The concentration of the dispersant can be less than 1.7 mg of dispersant per square meter of carbon black surface area.

BRIEF DESCRIPTION OF THE DRAWINGS

FIG. 1 is a copy of a photograph illustrating hiding power of eight different pigmented coatings;

FIG. 2 is a copy of a photograph illustrating the hiding power of another pigmented coating;

FIG. 3 graphically illustrates the jetness of multiple embodiments of coatings;

FIGS. 7A, 7B, 7C and 7D provide masstone and tint formulation data for embodiments of acrylic and alkyd coatings;

FIGS. 8A, 8B, 8C and 8D provide masstone and tint formulation data for additional embodiments of acrylic and alkyd coatings;

FIGS. 9A, 9B, 9C and 9D provide masstone and tint formulation data for additional embodiments of acrylic and alkyd coatings;

FIGS. 10A and 10B are copies of transmission electron micrographs showing the dispersion of carbon black particles of two different embodiments; and FIG. 11 graphically displays viscosity data for two different millbase embodiments.

DETAILED DESCRIPTION

Figure 4:
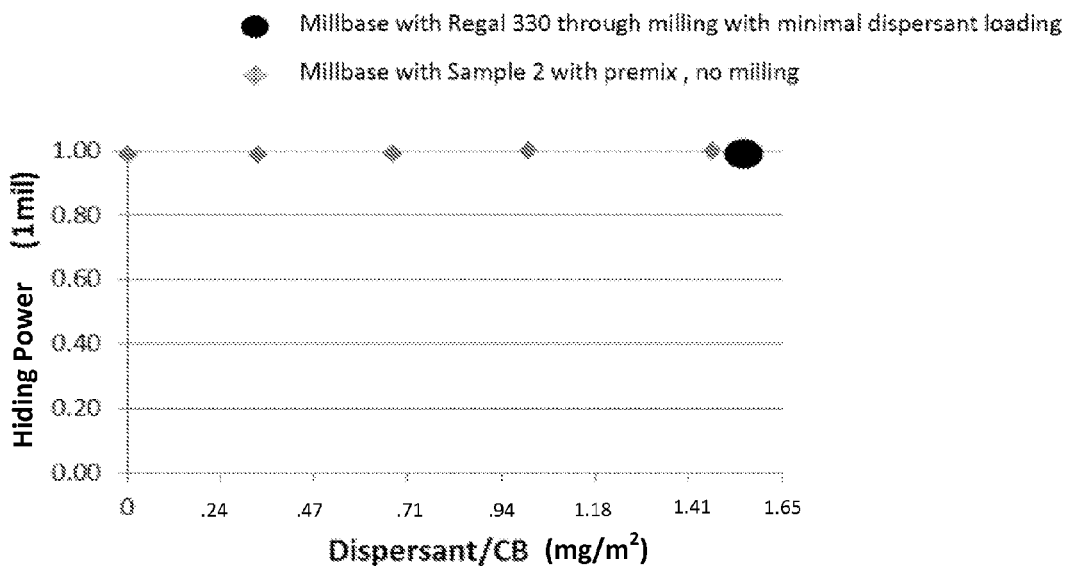
FIG. 4 graphically illustrates the hiding power of multiple embodiments of coatings.

Different methods, treatments and additives can be used to disperse carbon black particles in aqueous systems. For example, dispersants can be added to an aqueous vehicle and carbon blacks can be treated with compounds engineered to improve their dispersibility in the aqueous vehicle. In general, dispersibility can be improved by increasing the concentration of dispersant, increasing the treatment level of the carbon black, or both. Recognizing that excessive treatment and dispersant levels can negatively affect the properties of a liquid coating, as well as add to expense, this disclosure provides details regarding dispersions and methods that use certain modified carbon blacks in specific aqueous systems to reduce the amount of treatment and dispersant that would otherwise be required. A low energy, stir-in system is described in which a modified carbon black can be stirred into an aqueous system to produce a stable dispersion without the need for high energy milling processes that are typically employed. The discovery of a stable aqueous dispersion that combines a low level of treatment and low dispersant concentrations provides for an economical, flexible system for producing liquid millbases and coatings.

In one aspect, a treated (modified) carbon black is stirred into an aqueous vehicle to produce a liquid aqueous (waterborne) coating. The modified carbon black can be dispersed directly into the aqueous vehicle without energy intensive milling that is typically required to disperse unmodified carbon blacks in aqueous vehicles. The modified carbon blacks described herein can have relatively low concentrations of attached functional groups and may require no, or minimal, amounts of dispersants in the aqueous vehicle. For instance, the treated carbon blacks may be modified at a treating agent concentration of greater than 1.0, 1.25, 1.5 or 2.0 $\mu mol/m^2$ and less than 4.0, 3.5, 3.0, 2.5, 2.0 or 1.925 $\mu mol/m^2$. In some embodiments, the carbon blacks, prior to modification or surface treatment, exhibit a statistical thickness surface area (STSA or t-area, measured according to ASTM D6556) range of between 20 $m^2/g$ and 300 $m^2/g$. In one set of methods, undispersed dry carbon black powder can be mixed directly into an aqueous coating formulation, eliminating the intermediate step of making a millbase that is subsequently let down in an aqueous vehicle to produce a liquid coating. In another set of embodiments, a low viscosity millbase having a high modified carbon black content is made that can then be let down to produce a liquid aqueous coating.

Carbon blacks are used to provide pigmentation in a variety of materials. Coatings can improve the features of many surfaces and can provide, for example, functional, decorative, or protective improvements. Surfaces can include substrates such as metal, plastics, glass, wood and paper. Some of the products that can benefit from coatings include automobiles, boats, aircraft, pipes, appliances, industrial machinery, furniture, packaging and electronic displays.

Most coatings are applied as either liquids or solids. Powder coatings, for instance, are applied as a solid while many coatings are applied as a liquid that can then be converted to a solid. As used herein, a "liquid coating" is a liquid coating dispersion including a dispersed pigment that is to be applied to a substrate. A liquid coating includes a liquid carrier and additional components that may be dissolved, dispersed or suspended therein. A liquid coating is typically converted to a solid coating by drying after application to a substrate. A solid coating, or "coating," is not a liquid but may contain traces of solvents or other fluids. Any pigment particles in a coating are fixed and are not free to move. Conversion from a liquid coating to a coating may occur, for example, by evaporation of a solvent and/or polymerization of a resin or other polymeric material. A liquid coating is in condition to be applied to a substrate without further dilution, unlike a millbase which is to be let down prior to application. Liquid coatings can include a liquid phase, or solvent, one or more binders, and one or more pigments. In addition, a variety of additives can be used, including dispersants, defoamers, wetting agents, coalescing agents, rust inhibitors and/or antimicrobial agents. The liquid phase plus the binder is referred to as the vehicle. The vehicle may also include non-pigment substances such as dispersants, wetting agents and buffers. Liquid coatings can be aqueous or non-aqueous based. As used herein, the solvent portion (the liquid fraction that evaporates when the final coating is dried or cured) in an aqueous or waterborne liquid coating includes at least 90% water by weight and in many cases the solvent system is greater than 95% or greater than 99% water by weight. Similarly, the aqueous or waterborne liquid coating can include greater than 50%, greater than 80% or greater than 90% water by weight based on the entire mass of the aqueous or waterborne liquid coating. Aqueous dispersions typically have higher dielectric constants than do non-aqueous dispersions, and in many cases the dispersions or waterborne coatings described herein may have dielectric constants greater than 50, greater than 60 or greater than 70 and up to the dielectric constant of water, about 80.

Pigments in a coating can provide both opacity and color to the coating and can alter other properties such as gloss, mechanical strength and durability. Pigments also affect liquid coating properties such as viscosity. Pigments such as carbon black can be difficult to disperse in a liquid such as water, and high concentration carbon black millbases are often let down to produce the liquid coating. Prior attempts to disperse the carbon black directly into the final letdown have required too much energy, resulting in destruction of the waterborne latex emulsion. If a pigment such as carbon black is already dispersed in a millbase, the let down into the liquid coating is typically easier than forming a liquid aqueous coating directly from an undispersed carbon black powder. Millbases can include a high concentration of pigments such as carbon black, for example, from 25 to 58 percent by weight, while the liquid coating includes a lower concentration of pigment, typically from 0.5 to 3 percent by weight.

In the coatings field, liquid coatings including modified and unmodified carbon blacks are often prepared by bead milling the carbon blacks in a carrier in order to properly disperse the carbon black. The carbon black is typically added to an Eiger mill or other media mill along with grinding media, water, a resin, a defoamer, a coalescing agent and other optional materials to help promote a stable dispersion. The mill can be operated for up to several hours while milling at high energy. Typically, more than 100 watts of power is required to produce a 200 g sample of a millbase. The grinding media are filtered out of the millbase after completion of the dispersion process. The millbase may contain greater than 30% by weight of treated carbon black. The millbase dispersion can be let down to form a liquid coating by diluting the millbase with a vehicle that can include an aqueous solvent (water), a resin, dispersant, wetting agent, and additional materials that can vary with a particular application. Although highly treated carbon blacks (greater than 10 $\mu mol/m^2$) may provide stable aqueous dispersions, it has been found that the combination of highly treated carbon blacks and some resins, such as acrylic resins, can result in coatings with poor hiding properties.

The modified carbon blacks and liquid coatings described herein possess properties that can eliminate the need for high energy bead milling. A stirring or stir-in process does not require the addition of glass beads or other media that must be filtered out of the resulting dispersion. Stirring may be done using a mixer, such as, for example, a paddle mixer or a high speed mixer. Stirring can require less energy than conventional bead milling, meaning that dispersions or emulsions will not be destroyed by the high energy milling process. In many embodiments, the power required to stir in the modified carbon black particles is less than 100 watts, less than 70 watts, less than 50 watts or less than 40 watts for a 200 g sample, and stable dispersions can be achieved in less than three hours, less than two hours or less than one hour at these power levels. In some embodiments, the speed of the mixer can be limited to a mixing blade tip speed of less than 10 m/s, less than 5 m/s, less than 3 m/s or less than or equal to 2 m/s. Stirring need not raise the temperature of the dispersion like bead milling can. For example, in some embodiments, the stirring process will raise the temperature of the liquid vehicle by less than 10° C., less than 5° C. or less than 1° C. In contrast, milling processes can raise the temperature of the liquid vehicle by greater than 10° C., which can result in a number of problems, including gelling of the mixture.

The modified carbon black particles described herein can remain dispersed in an aqueous system for months or years. As used herein, a stable dispersion is a dispersion in which there is no statistically significant decrease in the hiding power of a coating made from the dispersion at a loading of 1% carbon black, by weight, after aging the dispersion for one week at elevated temperature, e.g., 52° C. If the dispersion contains greater than 1% modified carbon black by weight, such as in the case of a millbase, the dispersion is aged and subsequently let down in an aqueous vehicle including a compatible resin to 1% carbon black by weight to test the hiding power. When dry, the coating will include about 3% carbon black by weight. As used herein, a "letdown" includes liquid coatings made by diluting a millbase as well as liquid coatings made directly by dispersing an undispersed pigment into a liquid vehicle.

In one set of embodiments, a modified carbon black pigment can be stirred directly into an aqueous liquid vehicle to produce a stable liquid aqueous coating such as a paint or undercoat. The letdown product can be a waterborne liquid coating having a dispersed pigment content of, for example, 1%, 2%, 3% or 4% by weight. The waterborne liquid coating can be produced without an intermediate step of producing a millbase. In one embodiment, a liquid coating containing from 1% to 5% modified carbon black by weight can be made directly from the modified carbon black without forming an intermediate dispersion (millbase) that has a carbon black concentration of greater than 10% by weight. While a coating manufacturer might previously have required several different millbases to assure compatibility with different coating formulations, a single dry modified carbon black can replace several millbases, as the dry modified carbon black can be void of potentially incompatible components such as incompatible resins. A dry modified carbon black can be shipped at a lower cost than a millbase containing an equivalent amount of carbon black, and the dry material may also be stable for a longer period of time. In addition to dry powder form, an undispersed modified carbon black may also be delivered in an alternative undispersed form such as a slurry or gel that can be stirred into the liquid vehicle to form the liquid coating.

In another set of embodiments, a high loading millbase is made using the modified carbon blacks described herein. The millbase can include modified carbon black at concentrations of greater than 30%, greater than 35%, or greater than or equal to 40% by weight and can still achieve a useful viscosity (at 10 rpm unless otherwise stated) of less than 1100 cP, less than 1000 cP, less than 800 cP, less than 700 cP, less than 650 cP, less than 600 cP or less than 560 cP. In some embodiments, millbases may be limited to a modified carbon black concentration of less than 60% or less than 50% by weight. Dispersion viscosities are measured using a Brookfield® DV-II+ viscometer (Brookfield Engineering Laboratories, Middleboro, Mass.) employing the following procedure.

After the instrument is powered up, the chiller is turned on and the temperature set to 25° C. The instrument is then zeroed using the auto zero process as instructed by the instrument display. A spindle is selected by pressing the "set spindle" function until the chosen spindle (#3 is used herein unless otherwise specified) is highlighted. The "set spindle" function is pressed again to enter the selection. A small sample cup is partly filled with the dispersion to be tested. If using a disk type geometry (such as #3), the disk is placed into the dispersion and rotated gently to release any air that might be trapped under the disk. Bullet-shaped geometries can be attached directly to the spindle. The sample cup is then placed in the jacketed holder on instrument, and, if not already attached, the geometry is screwed onto the spindle. Using a pipette, the sample cup is filled to about 2.5 mm from the top and the speed is set to 10 rpm. The motor is turned on and the system is allowed to equilibrate for a minute at 10 rpm. This is repeated at 20 rpm, 50 rpm and 100 rpm. After equilibrating for one minute at 100 rpm, the test is complete and the motor is turned off.

To arrive at a particular carbon black concentration in a liquid aqueous coating, a higher loading of carbon black in a millbase allows for use of a smaller amount of millbase compared to a millbase of a lower carbon black concentration. Millbases including higher carbon black pigment loadings, if stable, can therefore reduce costs of, for instance, shipping and storage. At these higher concentrations, millbases typically become too viscous to work and may be too viscous to pass through a bead mill. For instance, to pass through an Eiger mill, millbases including medium structure carbon blacks are typically limited to a carbon black concentration of about 25% unless large amounts of dispersant are used. The modified carbon blacks described herein provide for lower viscosities at higher loadings. Because the modified carbon blacks can be stirred, rather than milled, into a millbase, higher viscosities can be tolerated in the production process. For example, a carbon black having an STSA surface area of 85.5 m$^2$/g (STSA prior to treatment) and a primary particle size of 25 nm that is treated with about 1.925 µmol/m$^2$ of sulfanilic acid can form an easily pourable millbase at a dispersant concentration of less than 2.4 mg per square meter of carbon black surface area (STSA prior to treatment) and a loading of 40% modified carbon black by weight. This allows for a reduction in the volume of millbase required by about 28.5% to make an equivalent liquid coating when compared to a conventionally milled product (25% carbon black). This also means that the liquid coating formulator can more carefully control the types and concentrations of components such as resins and dispersants that are in the final liquid coating because the more concentrated millbase (based on carbon black) contributes lesser amounts of these materials to the final aqueous liquid coating. In addition to eliminating or reducing the amount of milling required, the mixing power (speed) can be significantly reduced. For example, some embodiments of the treated carbon blacks described herein can be adequately dispersed by mixing at a mixing blade tip velocity of less than 10 m/s, less than 5 m/s, less than 4 m/s, less than 3 m/s or less than or equal to 2 m/s. In comparison, currently used modified and unmodified carbon black pigments are typically prepared by milling and mixing at a tip speed of greater than 10 m/s, in the presence of an increased concentration of dispersant.

Several measurable optical factors can be used to evaluate coatings comprising pigments such as carbon blacks. The color can be represented three dimensionally by measuring jetness (L*), blue/yellow (b*) and red/green (a*). An L* value of 0 would be perfectly black while higher numbers are whiter. The liquid coatings described herein can be cured to a coating having an L* value of less than or equal to 5, less than or equal to 4.5, less than or equal to 4, less than or equal to 3.5 or less than or equal to 3. A negative b* value indicates blue undertones while a positive b* is yellow. The liquid coatings described herein can be cured to a coating having a b* value of less than or equal to −0.2, less than or equal to −0.3, less than or equal to −0.4, or less than or equal to −0.5. A negative a* value indicates greener tones while a positive a* value indicates redder tones. These values can be measured in a laboratory using instrumentation such as a Hunter Lab Scan 6000. Another important factor in evaluating a carbon black for use in a coating is the "hiding power" of the coating. More favorable coatings have the ability to completely or substantially mask or hide the substrate on which they are coated. Many embodiments of the coatings described herein are able to mask the substrate in very thin coats, and can result in coatings having a hiding power of greater than or equal to 0.95, greater than or equal to 0.97, greater than or equal to 0.98, greater than or equal to 0.99 or equal to 1 in thin 0.0254 mm coats. Hiding power can be measured using a Leneta® paint test chart with half black and half white or a BYK Opacity Chart #2813. The hiding power of the coating is the ratio of the optical density on the white area to the optical density on the black area.

Carbon blacks are known to those skilled in the art and include channel blacks, furnace blacks, gas blacks, and lamp blacks. Carbon blacks from a variety of suppliers can be used. Some commercially available carbon blacks are sold under the Regal®, Black Pearls®, Elftex®, Monarch®, Mogul®, Spheron®, Sterling®, and Vulcan® trademarks and are available from Cabot Corporation (such as Black Pearls® 1100, Black Pearls® 1000, Black Pearls® 900, Black Pearls® 880, Black Pearls® 800, Black Pearls® 700, Black Pearls® 570, Black Pearls® L, Elftex® 8, Elftex® 320, Monarch® 1100, Monarch® 1000, Monarch® 900, Monarch® 880, Monarch® 800, Monarch® 700, Mogul® L, Regal® 330, Regal® 400, Regal® 660 and Vulcan®. Other commercially available carbon blacks include but are not limited to carbon blacks sold under the Raven®, Statex®, Furnex®, and Neotex® trademarks, the CD and HV lines available from Columbian Chemicals, and the Corax®, Durax®, Ecorax® and Purex® products available from Orion Engineered Carbons.

The carbon blacks described herein can exhibit a specific range of STSAs. As used herein, the STSA of a modified carbon black is the STSA of the carbon black prior to the modification. In some embodiments, the carbon blacks that are modified have an STSA between about 10 $m^2/g$ and about 350 $m^2/g$, between about 20 $m^2/g$ and about 300 $m^2/g$, or between about 30 $m^2/g$ and about 150 $m^2/g$. In one embodiment, a carbon black having an STSA of 85.5 $m^2/g$ has provided excellent results. If the desired surface area is not readily available for the desired application, it is also well recognized by those skilled in the art that the modified carbon black may be subjected to size reduction or comminution techniques, such as ball or jet milling or sonication, to reduce the pigment to a smaller particle size, if desired. Also, the modified carbon black can have a wide variety of primary particle sizes known in the art. For example, the carbon black may have a primary particle size of between about 5 nm to about 100 nm, including about 10 nm to about 80 nm and 15 nm to about 50 nm. In some embodiments, the carbon black may have a primary particle size of less than 200, less than 100 or less than 75 nm. In addition, the carbon black can also have a wide range of dibutylphthalate adsorption (DBP by ASTM D2414) values, which is a measure of the structure or branching of the pigment. For example, carbon black may have a DBP value of from about 25 to 400 mL/100 g, including from about 30 to 200 mL/100 g and from about 50 to 150 mL/100 g. In aqueous dispersions such as millbases and liquid coatings, the modified carbon black particle dispersions can exhibit D90 less than 0.6 μm, for example, from 0.1 to 0.6 μm, 0.1 to 0.4 μm or from 0.15 to 0.5 μm.

The carbon black prior to treatment may also be a carbon black that has been oxidized using an oxidizing agent in order to introduce ionic and/or ionizable groups onto the surface. Carbon blacks prepared in this way have been found to have a higher degree of oxygen-containing groups on the surface. Oxidizing agents include, but are not limited to, oxygen gas, ozone, $NO_2$ (including mixtures of $NO_2$ and air), peroxides such as hydrogen peroxide, persulfates, including sodium, potassium, or ammonium persulfate, hypohalites such a sodium hypochlorite, halites, halates, or perhalates (such as sodium chlorite, sodium chlorate, or sodium perchlorate), oxidizing acids such a nitric acid, and transition metal containing oxidants, such as permanganate salts, osmium tetroxide, chromium oxides, or ceric ammonium nitrate. Mixtures of oxidants may also be used, particularly mixtures of gaseous oxidants such as oxygen and ozone. In addition, carbon blacks prepared using other surface modification methods to introduce ionic or ionizable groups onto a pigment surface, such as chlorination and sulfonylation, may also be used.

The carbon black may be a modified carbon black having attached at least one organic group. The organic group may be directly attached. A group that is directly attached is one that is chemically bonded to the carbon black and not simply associated with the carbon black. An organic group is directly attached to a carbon black if greater than 75% of the organic group is retained on the carbon black when it is rinsed with deionized water.

The modified carbon black may be prepared using any method known to those skilled in the art such that organic chemical groups are attached to the pigment. For example, the modified pigments can be prepared using the methods described in U.S. Pat. Nos. 5,554,739; 5,707,432; 5,837,045; 5,851,280; 5,885,335; 5,895,522; 5,900,029; 5,922,118; 6,042,643 and 6,337,358, the descriptions of which are fully incorporated herein by reference. Such methods provide for a more stable attachment of the groups onto the carbon black compared to dispersant type methods, which use, for example, polymers and/or surfactants. Other methods for preparing the modified carbon blacks include reacting a carbon black having available functional groups with a reagent comprising the organic group, such as described in, for example, U.S. Pat. No. 6,723,783, which is incorporated in its entirety by reference herein. Such functional pigments may be prepared using the methods described in the references incorporated above. In addition modified carbon blacks containing attached functional groups may also be prepared by the methods described in U.S. Pat. Nos. 6,831,194 and 6,660,075, U.S. Patent Publication Nos. 2003-0101901 and 2001-0036994, Canadian Patent No. 2,351,162, European Patent No. 1 394 221, and PCT Publication No. WO 04/63289, as well as in N. Tsubokawa, Polym. Sci., 17, 417, 1992, each of which is also incorporated in their entirety by reference herein.

The organic group of the modified carbon black may be a group that enables the modified carbon black to be dispersible in the aqueous vehicle of a selected liquid coating or millbase. The organic group may include an ionized or ionizable group. As used herein, an organic group that is used to treat a carbon black prior to forming an aqueous dispersion, by diazonium chemistry for example, is not considered to be a dispersant in the aqueous liquid dispersion made from the modified carbon black.

The attachment (treatment) level of the organic group on the modified carbon black should be adequate to provide for a stable dispersion of the modified carbon black in the aqueous vehicle. Attachment levels are provided in terms of mols of organic group per surface area (STSA) of carbon black. For example, organic groups may be attached at a level of 0.1 to 10.0 $\mu mol/m^2$, 0.2 to 5.0 $\mu mol/m^2$, 0.5 to 2.5 $\mu mol/m^2$, 0.5 to 2.0 $\mu mol/m^2$, 0.5 to 1.5 $\mu mol/m^2$, 1.5 to 3.0 $\mu mol/m^2$, 1.5 to 4.0 $\mu mol/m^2$, 1.5 to 4.5 $\mu mol/m^2$ or 1.0 to 2.0 $\mu mol/m^2$. In some embodiments, the level of attachment may be greater than 0.1 $\mu mol/m^2$ and less than 3.0 $\mu mol/m^2$ or greater than 0.1 $\mu mol/m^2$ and less than 2.0 $\mu mol/m^2$. Levels of attachment for groups including ionic or ionizable groups can also be quantified in terms of equivalents per area. These levels of attachment can be determined by methods known to those of skill in the art, such as elemental analysis.

Groups can be attached to carbon blacks using methods such as diazonium chemistry, azo chemistry, peroxide chemistry, sulfonation and cycloaddition chemsitry. Diazonium processes disclosed in one or more of these incorporated references can be adapted to provide a reaction of at least one diazonium salt with an carbon black pigment such as a raw organic black pigment that has not yet been surface modified with attachment groups. A diazonium salt is an organic compound having one or more diazonium groups. In some processes, the diazonium salt may be prepared prior to reaction with the organic black pigment material or, more preferably, generated in situ using techniques such as described in the cited references. In situ generation also allows the use of unstable diazonium salts such as alkyl diazonium salts and avoids unnecessary handling or manipulation of the diazonium salt. In some processes, both the nitrous acid and the diazonium salt can be generated in situ.

A diazonium salt, as is known in the art, may be generated by reacting a primary amine, a nitrite and an acid. The nitrite may be any metal nitrite, preferably lithium nitrite, sodium nitrite, potassium nitrite, or zinc nitrite, or any organic nitrite such as for example isoamylnitrite or ethylnitrite. The acid may be any acid, inorganic or organic, which is effective in the generation of the diazonium salt. Preferred acids include nitric acid, $HNO_3$, hydrochloric acid, HCl, and sulfuric acid, $H_2SO_4$. The diazonium salt may also be generated by reacting the primary amine with an aqueous solution of nitrogen dioxide. The aqueous solution of nitrogen dioxide, $NO_2/H_2O$, can provide the nitrous acid needed to generate the diazonium salt. In general, when generating a diazonium salt from a primary amine, a nitrite, and an acid, two equivalents of acid are required based on the amine. In an in situ process, the diazonium salt can be generated using one equivalent of the acid. When the primary amine contains a strong acid group, adding a separate acid may not be necessary in some processes. The acid group or groups of the primary amine can supply one or both of the needed equivalents of acid. When the primary amine contains a strong acid group, preferably zero to one equivalent of additional acid can be added to a process to generate the diazonium salt in situ. One example of such a primary amine that has shown exceptional properties is para-aminobenzenesulfonic acid (sulfanilic acid).

The surface-modified carbon blacks can comprise a carbon black pigment having attached at least one organic group. The modified carbon black can have attached at least one organic group having the formula —X—Z, wherein X, which is a first chemical group directly attached to the carbon black, represents an arylene group, a heteroarylene group, an aralkylene group, or an alkarylene group, and Z represents a second chemical group. Z can be non-polymeric. Z can be, for example, at least one ionic group or at least one ionizable group.

As indicated, the group X can represent an arylene or heteroarylene group, an an aralkylene group, or an alkarylene group. X can be directly attached to the pigment and is further substituted with the Z group. X can be a linker group (e.g., a linking diradical) that preferably can be directly bonded between the pigment surface and the Z group. The arylene and heteroarylene groups can be an aromatic group including, but not limited to, unsaturated cyclic hydrocarbons containing one or more rings. For the heteroarylene groups, one or more ring carbons of the aromatic group are substituted by a hetero atom. The heteroatoms are non-carbon atoms such as N, S, O, or others. The hydrogens of the aromatic group can be substituted or unsubstituted. As indicated, X can represent a heteroarylene group. It has been found that using a diazonium chemistry route including heterocycle based diazonium salts to treat organic black pigment surfaces, such as perylene black surfaces, can make it easier to attach the surface modification groups.

The heteroarylene group can be a linker group which comprises, for example, at least one heterocyclic ring which contains one or more heteroatoms (e.g., one, two, three, or more heteroatoms). The heterocyclic ring can contain, for example, from 3 to 12 ring member atoms, or from 5 to 9 ring members, or 5, or 6, or 7, or 8 membered rings. The heterocyclic ring can include, for example, at least one carbon atom, or at least two carbon atoms, or other numbers of carbon atoms. When multiple heteroatoms are used in a heterocyclic ring, the heteroatoms can be the same or different. The heterocyclic group may contain a single heterocyclic ring or fused rings including at least one heterocyclic ring. The heteroarylene group can be, for example, imidazolylene, pyrazolylene, thiazolylene, isothiazolylene, oxazolylene, isoxazolylene, thienylene, furylene, fluorenylene, pyranylene, pyrrolylene, pyridylene, pyrimidylene, indolylene, isoindolylene, tetrazolylene, quinolinylene, isoquinolinylene, quinazolinylene, carbazolylene, purinylene, xanthenylene, dibenzofurylene, 2H-chromenylene, or any combinations thereof. X can also represent an arylene group, such as a phenylene, naphthylene, biphenylene phenyl, anthracenylene, and the like. When X represents an alkylene group, examples include, but are not limited to, substituted or unsubstituted alkylene groups that may be branched or unbranched. For example, the alkylene group can be, for example, a $C_1$-$C_{12}$ group such as methylene, ethylene, propylene, or butylene, or other alkylenes.

The group X can be further substituted with groups other than Z, such as one or more alkyl groups or aryl groups. Also, the group X can be substituted, for example, with one or more functional groups. Examples of functional groups include, but are not limited to, R, OR, COR, COOR, OCOR, carboxylates, halogens, CN, $NR_2$, $SO_3H$, sulfonates, sulfates, NR(COR), $CONR_2$, $NO_2$, $PO_3H_2$, phosphonates, phosphates, N—NR, SOR, $NSO_2R$, wherein R, which can be the same or different, is independently hydrogen, branched or unbranched $C_1$-$C_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkaryl, or substituted or unsubstituted aralkyl.

As indicated, group Z can be at least one ionic group or ionizable group. The group Z can also comprise a mixture of an ionic group and an ionizable group. The ionic group can be either anionic or cationic and can be associated with a counterion of the opposite charge including counterions such as $Na^+$, $K^+$, $Li^+$, $NH^{4-}$, $NR'^{4+}$, acetate, $NO_3—$, $SO_4^{-2}$, $R'SO_3—$, $R'OSO_3—$, OH—, and Cl—, where R' represents hydrogen or an organic group such as a substituted or unsubstituted aryl and/or alkyl group. The ionizable group can be one that is capable of forming an ionic group in the medium of use. Anionizable groups can form anions and cationizable groups can form cations. Ionic groups include those described in U.S. Pat. Nos. 5,698,016; 5,837,045; and 5,922,118, the descriptions of which are fully incorporated herein by reference. The anionic groups are negatively charged ionic groups that may be generated from groups having ionizable substituents that can form anions (anionizable groups), such as acidic substituents. They may also be the anion in the salts of ionizable substituents. Representative examples of anionic groups include —COO—, —$SO_3$—, —$OSO_3$—, —$HPO_3$—, —$OPO_3^{-2}$, and —$PO_3^{-2}$. The anionic group can comprise a counterion that is a monovalent metal salt such as a $Na^+$ salt, a $K^+$ salt or a $Li^+$ salt. The counterion may also be an ammonium salt, such as a $NH^{4+}$ salt. Representative examples of anionizable groups include —COOH, —$SO_3H$, —$PO_3H_2$, —R'SH, —R'OH, and —$SO_2NHCOR'$, where R' represents hydrogen or an organic group such as a substituted or unsubstituted aryl and/or alkyl group. The cationic groups are positively charged ionic groups that may be generated from ionizable substituents that can form cations (cationizable groups), such as protonated amines. For example, alkyl or aryl amines may be protonated in acidic media to form ammonium groups —$NR'_2H^+$, where R' represent an organic group such as a substituted or unsubstituted aryl and/or alkyl group. Cationic groups may also be positively charged organic ionic groups. Examples include quaternary ammonium groups (—$NR'^{3+}$) and quaternary phosphonium groups (—$PR'^{3}$). Here, R' represents hydrogen or an organic group such as a substituted or unsubstituted aryl and/or alkyl group. The cationic group can comprise an alkyl amine group or a salt thereof or an alkyl ammonium group.

The group Z can comprise at least one carboxylic acid group or salt thereof, at least one sulfonic acid group or salt thereof, at least one sulfate group, at least one phosphonic acid group or salt thereof, a least one alkyl amine group or salt thereof, or at least one alkyl ammonium group. Since it can be preferred that the group X be a heteroarylene group or an arylene group, attached organic groups having the formula —X—Z can include, but are not limited to, heteroaryl carboxylic acid groups, heteroaryl sulfonic acid groups, aryl carboxylic acid groups, aryl sulfonic acid groups, or salts thereof. For example, the attached organic group can be, for example, an imidazolyl carboxylic acid group, an imidazolyl sulfonic acid group, a pyridinyl carboxylic acid group, a pyridinyl sulfonic acid group, a benzene carboxylic acid group, a benzene dicarboxylic acid group, a benzene tricarboxylic acid group, a benzene sulfonic acid group, or salts thereof. The attached organic group may also be a substituted derivative of any of these.

As used herein, dispersants are substances that can be used in aqueous systems to aid in forming a dispersion of otherwise non-dispersible carbon black particulates. Dispersants associate strongly with particles and are selected for their ability to keep particles apart. Dispersants can include surfactants, functionalized polymers and oligomers. Dispersants may be non-ionic dispersants or may be ionic dispersants which include both anionic and cationic dispersants. Non-ionic dispersants are preferred and among ionic dispersants, anionic dispersants are preferred. Dispersants may be amphiphilic and may be polymeric or include a polymeric group. Dispersants do not include other additives that may be used in aqueous coatings such as wetting agents, defoamers and co-solvents.

The concentration of dispersants in a millbase or an aqueous coating can be measured in several ways known to those of skill in the art. The amount of dispersant required to adequately disperse a carbon black is believed to more accurately be a function of the surface area of the particles in dispersion rather than the mass of particles in dispersion. Therefore, unless otherwise stated, the concentration of a dispersant in a particular dispersion will be provided in units of mass of dispersant per total area (STSA) of carbon black in the dispersion. For example, units may be milligrams of dispersant per square meter of carbon black surface area as determined by STSA. As it may be difficult to precisely determine the surface area of a modified (treated) carbon black, in the case of a dispersion including a modified carbon black, the area of the corresponding untreated carbon black will be used when providing the concentration of a dispersant in the dispersion.

Specific examples of polymeric dispersants include synthetic polymeric dispersants. Ethoxylates are commonly used in waterborne formulations as dispersants. For instance, alkylphenol ethoxylates and alkyl ethoxylates are used. Examples include PETROLITE® D-1038 from Baker Petrolite. Polymers and related materials that can be used for dispersants and additives in aqueous coatings are included in the Tego products from Evonik, the Ethacryl products from Lyondell, the Joncryl polymers and EFKA dispersants from BASF, and the Disperbyk® and Byk® dispersants from BYK. Exemplary dispersants that may be employed include but are not limited to DisperBYK182, DisperBYK 190 and or DisperBYK 192, all available from BYK Chemie, Solsperse™ dispersants available from Lubrizol, including 46000; and EFKA4585, ELKA4550, and EFKA4560 from Ciba.

Various rheology modifiers can also be used in conjunction with the aqueous coating composition to adjust the viscosity of the composition as well as to provide other desirable properties. Suitable compounds include, but are not limited to, water soluble polymers and copolymers such as gum arabic, polyacrylate salts, polymethacrylate salts, polyvinyl alcohols (Elvanols from DuPont, Celvoline from Celanese), hydroxypropylenecellulose, hydroxyethylcellulose, polyvinylpyrrolidinone (such as Luvatec from BASF, Kollidon and Plasdone from ISP, and PVP-K, Glide), polyvinylether, starch, polysaccharides, polyethyleneimines with or without being derivatized with ethylene oxide and propylene oxide and the like. In addition, the binder may be added or present in dispersion or latex form. For example, the polymeric binder may be a latex of acrylate or methacrylate copolymers (such as NeoCryl® materials from DSM Neoresins, the AC and AS polymers from Alberdingk-Boley) or may be a water dispersible polyurethane (such as ABU from Alberdingk-Boley) or polyester (such as AQ polymers from Eastman Chemical). Polymers, such as those listed above, variations and related materials, that can be used for binders in aqueous coatings are included in the Joncryl® polymers from BASF, the NeoCryl materials from DSM Neoresins, and the AC and AS polymers from Alberdingk-Boley.

Various additives for controlling or regulating the pH of the aqueous coating compositions described herein may also be used. Examples of suitable pH regulators include various amines such as diethanolamine and triethanolamine as well as various hydroxide reagents. An hydroxide reagent is any reagent that comprises an OH⁻ ion, such as a salt having an hydroxide counterion. Examples include sodium hydroxide, potassium hydroxide, lithium hydroxide, ammonium hydroxide, and tetramethyl ammonium hydroxide. Other hydroxide salts, as well as mixtures of hydroxide reagents, can also be used. Furthermore, other alkaline reagents may also be used which generate OH⁻ ions in an aqueous medium. Examples include carbonates such as sodium carbonate, bicarbonates such as sodium bicarbonate, and alkoxides such as sodium methoxide and sodium ethoxide. Buffers may also be added.

In one set of embodiments it has been found that readily dispersible modified carbon blacks can be made by surface treating the untreated carbon black with sulfanilic acid using diazonium chemistry resulting in a modified carbon black including the benzene sulfonic acid group:

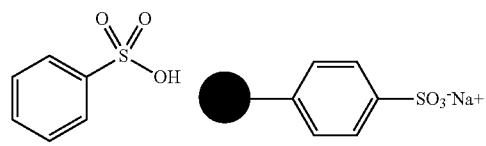

Benzene sulfonic acid  Benzene sulfonic acid salt chemically attached to carbon black (not to scale)

In a second set of embodiments, para-aminobenzoic acid is used to treat carbon blacks using diazonium chemistry to obtain a modified carbon black including a benzoic acid group:

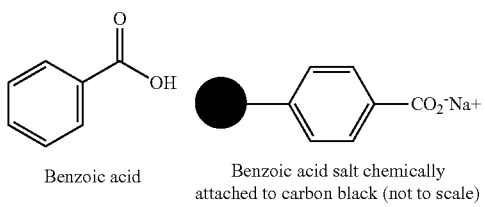

Benzoic acid     Benzoic acid salt chemically attached to carbon black (not to scale)

These groups may be helpful in rendering the modified carbon black dispersible and, as shown below, many of these treated carbon blacks can be stirred into coatings without the use of high energy or grinding media. Although higher loadings of treating agent are used to improve the dispersibility of a carbon black, it has been found that a reduced concentration of treatment results in a pigment that provides a stir-in liquid coating that dries to a coating having superior hiding power and color tones. It has also been found that, contrary to what is believed in the art, additional dispersant may have a negative effect on the dispersibility of some treated carbon blacks. As used herein, a "stir-in" carbon black is a modified carbon black that does not need to be bead milled in order to be stably dispersed in an aqueous vehicle. For instance, very specific modified carbon blacks having an STSA of less than 300 $m^2/g$ and a treatment level of less than 3.5, less than 3.0, less than 2.5 or less than or equal to 2.0 $\mu mol/m^2$ have been shown to provide excellent coverage and color in "stir-in" liquid coatings. Thus, surprisingly, a treated carbon black having a low treatment level (e.g., less than 3.5 $\mu mol/m^2$) can form a stable aqueous dispersion when made using a low energy stir-in process that results in a coating with excellent hiding and color characteristics. Contrary to conventional wisdom, these results can be achieved with low concentrations of dispersants. For example, relative to the amount of carbon black in a liquid coating, the dispersant concentration may be less than 5.0, less than 3.0, less than 2.4, less than 2.0, less than 1.8, less than 1.5, less than 1.0, less than 0.7, less than or equal to 0.5 or less than or equal to 0.2 mg dispersant per square meter of carbon black surface area (STSA). In the same or other embodiments, the dispersant concentration may be greater than 0.01, greater than 0.1, greater than 0.2 or greater than 0.5 mg dispersant per square meter of carbon black surface area. Specific dispersant ranges may be dependent on, for example, the treatment level of the modified carbon black that is being dispersed. These dispersant ranges maybe, for example, 0.1 to 3.5, 0.1 to 3.0, 0.1 to 2.5, 0.1 to 2.0, 0.1 to 1.5, 0.1 to 1.0, 0.1 to 0.7 and 0.1 to 0.5 mg dispersant per square meter of carbon black surface area. It has been found that one embodiment wherein the modified carbon black has been treated to an organic treatment loading of about 1.84 $\mu mol/m^2$ requires a minimal amount of dispersant. For example, in this embodiment, the amount of dispersant used to make a 40% by weight modified carbon black aqueous millbase can be in the range of 0.1 to 1.0, 0.1 to 0.7 or 0.1 to 0.5 mg dispersant per square meter of carbon black surface area. This millbase, when let down to an aqueous coating dispersion (1-5% modified carbon black) exhibits low viscosity, excellent hiding power, good jetness and good undertones. It is surprising that modified carbon blacks modified at higher treatment levels, greater than or equal to 3.5 $\mu mol/m^2$ for example, actually require a greater amount of dispersant in order to achieve this level of performance for hiding power and color.

In one set of embodiments it has been found that a dispersion including a particular combination of a carbon black with a low treatment level and liquid vehicle with a low dispersant concentration can provide dispersions that possess properties as good as or better than dispersions made using higher treatment levels or higher dispersant concentrations. For example, in one embodiment the treatment level can be limited to less than 3.5 $\mu mol/m^2$ with a dispersant concentration of less than 2.4 mg per square meter of carbon black. In another embodiment, the treatment level can be limited to less than 3.0 $\mu mol/m^2$ with a dispersant concentration of less than 2.4 mg per square meter of carbon black. In another embodiment, the treatment level can be limited to less than 1.84 $\mu mol/m^2$ with a dispersant concentration of less than 1.7 mg per square meter of carbon black. In another embodiment, the treatment level can be limited to less than 3.0 $\mu mol/m^2$ with a dispersant concentration of less than 1.0 mg per square meter of carbon black. In any of these embodiments with limitations on treatment levels and dispersant concentrations, when the level of treatment in units of $\mu mol/m^2$ is added to the dispersant concentration in units of mg dispersant per square meter of carbon black, the sum can be, for example, greater than or equal to 2.0, 2.5, 3.0 or 3.5.

Aqueous Coatings Evaluation Method—

To evaluate the use of carbon black millbases in forming aqueous coatings, the following procedure, referred to herein as "Aqueous Coatings Evaluation Method A," can be used to produce a film that can then be tested for properties such as color, hue and hiding power. The millbase being evaluated is let down into a final dispersion of 200 g with the components and quantities provided in the table below to achieve a carbon black concentration of 1% by weight in the final liquid coating. When cured, this formulation will result in a cured coating having carbon black content of about 3% by weight. If any of the letdown vehicle components are unavailable, they can be substituted with similar materials known to those of skill in the art. For example, Neocryl A-6085 can be replaced by another anionic acrylic-styrene copolymer latex resin. The carbon black millbases are stirred into the acrylic latex letdown vehicle of Table 12 using a Stir-Pak® Heavy Duty lab mixer fitted with a propeller-type stainless steel blade. The mixer is operated at setting 1.5 (500-1000 rpm) for 10 minutes. The final liquid dispersion is then applied to an opacity chart or stainless steel substrate at a selected thickness and cured to provide a pigmented coating that can then be evaluated for optical properties such as jetness (L*), blue/yellow undertone (b*), red/green undertone (a*) and hiding power.

| Waterborne Acrylic Letdown for Aqueous Coatings Evaluation Method A | |
|---|---|
| Neocryl A-6085 | 80.0 |
| Water | 8.4 |
| Sodium nitrite (25%) | 1.2 |
| Dehydran 1293 | 0.4 |
| Surfynol 104 DPM | 0.4 |
| BYK 346 | 0.1 |
| Dipropylene glycol methyl ether | 2.4 |
| Propylene glycol normal butyl ether | 4.8 |
| Dipropylene glycol normal butyl ether | 2.4 |
| Sum | 100.0 |
| % solids | 32.7 |

EXAMPLES

To evaluate the characteristics of coatings produced using the stir-in modified carbon blacks described herein, a series of coatings were made using the same untreated carbon black with different levels of organic treatment. The stir-in coatings were also compared to coatings made using the same untreated carbon black and liquid vehicle, but produced using a conventional bead milling process.

Example 1

An unmodified carbon black (Regal 330R) was treated with different amounts of sulfanilic acid using conventional diazonium chemistry to produce treated carbon blacks at treatment levels of 1.925 (Sample 1), 2.2 (Sample 2), 3.3 (Sample 3) and 4.4 µmol/m$^2$ (Sample 4). Regal 330R carbon black has an STSA of 85.5 m$^2$/g, a DBP structure of 65 mL/100 g, and an average primary particle size of 25 nm. The modified carbon black samples were stirred into the acrylic latex letdown vehicle of Table 1 using an overhead laboratory paddle mixer at a speed of 500 rpm to achieve a carbon black concentration of 1% by weight in the liquid coating. This resulted in a final cured coating having about 3% carbon black by weight. For a 200 g sample, the power required for mixing was less than 40 watts and the dry modified carbon black was dispersed in less than 60 minutes. The control was unmodified Regal 330R that was conventionally dispersed firstly into a millbase at a carbon black concentration of 15%. This millbase was then let down to a 1% carbon black (by weight) liquid coating using the same materials as in the experimental sample except that dispersant (PETROLITE D-1038) was added to achieve a concentration of 1.47 mg per square meter of carbon black surface area. This is in contrast to the value of 0.35 mg dispersant per square meter of carbon black surface area as provided in experimental samples 1-4. Each of the samples was drawn using a drawdown bar onto an opacity chart at a wet film thickness of 0.0254 mm. Each of the films dried to a film thickness of about 0.0082 mm. Copies of photographs of these films are provided in FIG. 1. As is evident from these photographs, the hiding power of the low energy stirred-in material for treatment levels at 1.925 and 2.2 µmol/m$^2$ is equal to that of the bead milled Regal 330R. However, samples with higher treatment levels (3.3 and 4.4umol/m2) exhibited poor hiding power. FIG. 2 shows a film that resulted from a coating made using Regal 330R that had been stirred, as were samples 1-4, without bead milling. This sample shows poor coverage, indicating that modified carbon blacks, as described herein, are important in obtaining good coverage when using a stir-in process. Thus, these experiments indicated that a low energy, stirred-in, treated carbon black with a relatively low level of dispersant can be substituted for high energy bead milled carbon black including a high dispersant concentration that must be introduced into the final letdown as a millbase.

TABLE 1

| Components | Function | Percentage (wt %) |
|---|---|---|
| Neocryl A-6085 | resin | 32.0 |
| Water | carrier | 56.4 |
| Sodium nitrite (25% water) | Flash rust inhibitor | 1.2 |
| Dehydran 1293 | defoamer and deaerator | 0.4 |
| Surfynol 104 DPM | defoamer, wetting agent | 0.4 |
| BYK 346 | wetting agent | 0.1 |
| Dipropylene glycol methyl ether | coalescence agent | 2.4 |
| Propylene Glycol Normal Butyl Ether | coalescence agent | 4.8 |
| Dipropylene Glycol Normal Butyl Ether | coalescence agent | 2.4 |

Example 2

In a further set of experiments, millbases including the modified carbon black of Sample 1 (1.925 µmol/m$^2$) were made at different levels of dispersant concentration including 0.35 mg dispersant (PETROLITE D-1038) per square meter of carbon black surface area, 0.70 mg dispersant per square meter of carbon black surface area, 1.05 mg dispersant per square meter of carbon black surface area and 1.47 mg dispersant per square meter of carbon black surface area. These millbases were let down using the formulation of Table 1 to provide a liquid coating. FIGS. 2A, 2B and 2C show graphical results comparing the L* (jetness), b* (undertone) and hiding power of the liquid coatings compared to a conventional coating of Regal 330R with 1.47 mg dispersant (PETROLITE D-1038) per square meter of carbon black surface area. As shown in FIG. 3, the L* color performance on a steel substrate is significantly improved over that obtained using the control (L* value of about 5). With no dispersant, Sample 1 provides an L* value of less than 3 and at 0.35 mg dispersant per square meter of carbon black surface area, sample 1 provides an L* value of 3.3, at 0.70 mg dispersant per square meter of carbon black surface area sample 1 provides an L* value of 3.5 while the conventional coating at a dispersant level of 1.47 mg dispersant per square meter of carbon black surface area has an L* value of 4.9.

FIG. 4 graphically illustrates the hiding power of all the samples. The coatings were each applied at a thickness of 0.0254 mm and were allowed to dry. The hiding power was evaluated using BYK Opacity Chart #2813. The bead milled control sample at a dispersant concentration of 1.47 mg/m$^2$ and all of the experimental samples exhibited a hiding power of 1. This illustrates that the experimental samples can exhibit the same hiding power as a conventional carbon black aqueous coatings having higher levels of dispersant and having been milled at high energy.

Figure 5:
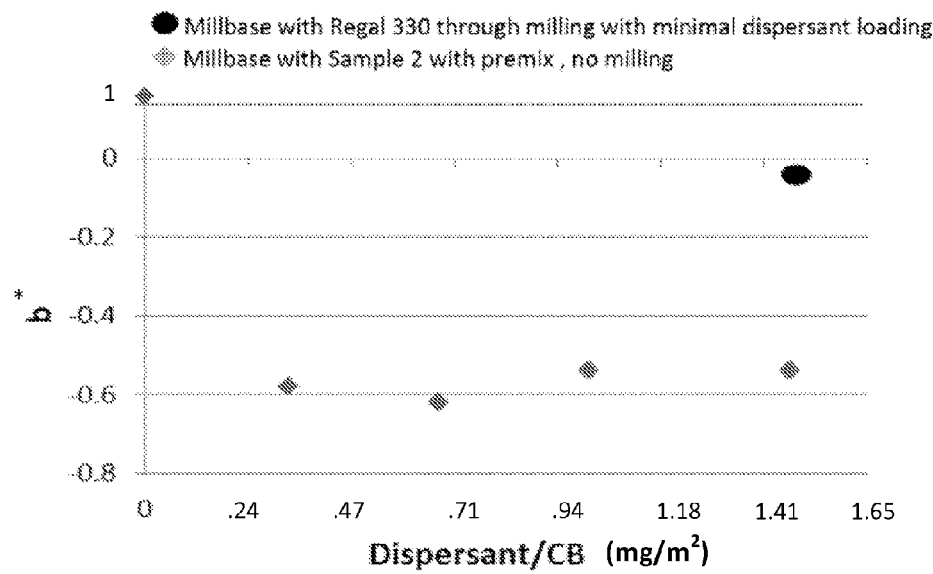
FIG. 5 graphically illustrates the blue undertone values of multiple embodiments of coatings.

FIG. 5 provides graphical data showing the blue undertone values for the experimental samples and the control. The conventional bead milled material at 1.47 mg/m$^2$ dispersant provided a b* value of approximately 0.0. With exception of the case with no dispersant at all, the stirred liquid coatings all resulted in coatings having negative (preferred) undertones of about −0.6. This illustrates the excellent blue undertone of the stirred-in coatings made from the modified carbon black systems described herein.

Example 3

In another experiment, a millbase (S) was made using the modified carbon blacks and processes described herein and was compared to a millbase (M) made using conventional carbon blacks. Millbase S was made to 35.5% carbon black by weight using the formulation of Table 2 with 0.35 mg/m2 dispersant loading. Sample S was made using 92 grams of Regal 330R that had been treated to a level of 1.925 µmol/m$^2$sulfanilic acid. Sample M was made using untreated Regal 330R. Sample S was stirred using a vertical paddle stirrer at 500 rpm (1.05 m/s tip speed) and 40 watts.

Sample M was intended to be processed first in a premix step with a high speed mixer (10 m/s tip speed), followed by a milling step in an Eiger mill. However, after the premix step, it was found that the paste was too thick to pass through the mill.

TABLE 2

| Ingredients | Mass (g) |
| --- | --- |
| Water | 128.2 |
| AMP-95 | 5.3 |
| Dehydran 1293 | 6 |
| Petrolite D1038 | 27.6 |
| Carbon black | 92 |

Figure 6A:
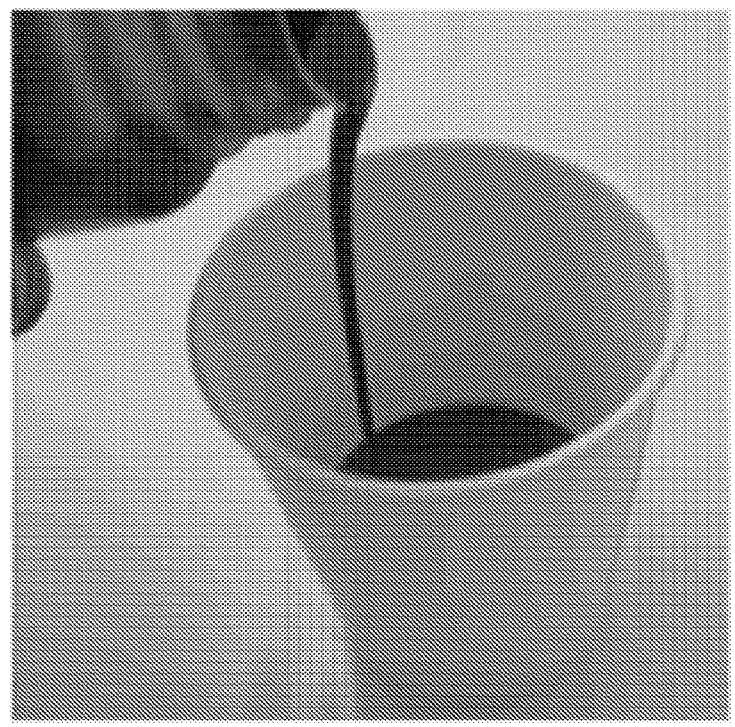
FIGS. 6A and 6B are photocopies of photographs illustrating the viscosity of two different embodiments of millbases.
Figure 6B:
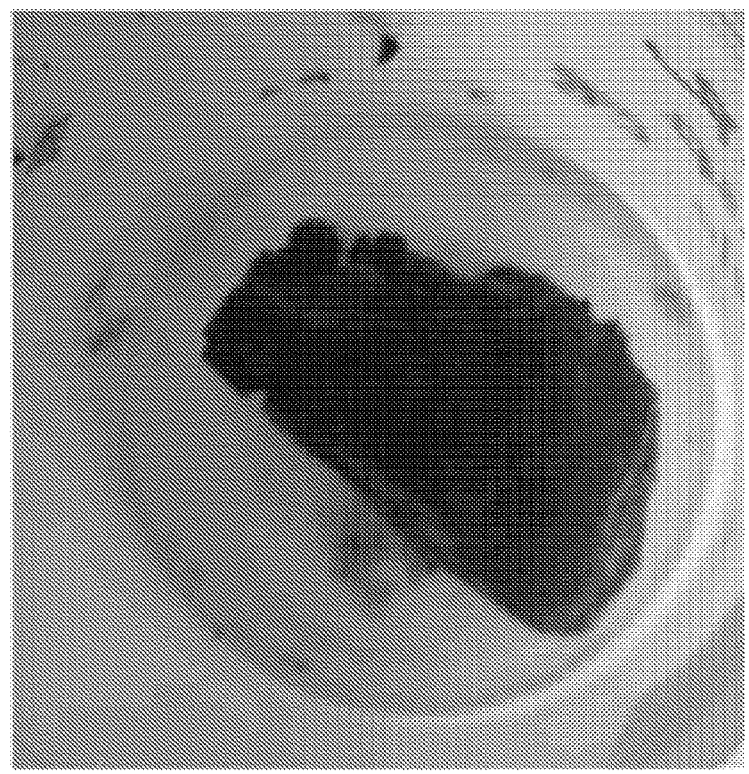

The results of each sample are seen in FIGS. 6A and 6B. As is clearly shown, sample S (6A) produced a pourable, well-dispersed millbase. Its viscosity was measured at 530 cP using the Brookfield viscometer and the method described herein. Sample M (6B), however, resulted in a thick paste that was not pourable and not appropriate for use as a millbase.

Another modified carbon black (Sample 5) was made by treating Black Pearls 800 (Cabot Corporation) to a surface concentration of 2.90 µmol/m$^2$ (STSA) sulfanilic acid. To prepare a stir-in carbon black millbase, Sample 5, water, base (AMP-95), defoamer (Dehydran 1293), and dispersant (Petrolite D-1038) were mixed with a Dispermat® (40 mm diameter Cowles blade) at 500 rpm (tip speed of 1.05 m/s) for 1-2 min (see Table 3). Sample 5 was added over 60 seconds while stirring. The mixing rate was then increased to 1000 rpm (tip speed 2.10 m/s) and the mixing was continued at 1,000 rpm for 30 min. The millbase contained 17.6% carbon black by weight and the active dispersant/carbon black ratio was about 3% by weight, or 0.157 mg active dispersant per square meter of carbon black surface area.

TABLE 3

| Raw Material | % by weight |
| --- | --- |
| Water | 73.1 |
| AMP-95 | 1.0 |
| Dehydran 1293 (10% active) | 3.0 |
| Petrolite D-1038 (10% active) | 5.3 |
| Sample 5 CB | 17.6 |
| Total | 100.0 |

To make a carbon black millbase using conventional carbon black of the same morphology as Sample 5, but without surface treatment, the formulation in Table 4 was used. Water, base, defoamer, and dispersant were mixed with a Dispermat® at 500 rpm for 1-2 min. Then, conventional carbon black (Black Pearls 800 (STSA 191 m$^2$/g), sample 6) was added under stirring. After all carbon black was added, the mixing rate was increased to 4,000 rpm (tip speed of 8.4 m/s) and the components were mixed for about 5 min. The premix was then passed through a horizontal bead mill for about 20 min. The millbase had 17.6% carbon black loading, identical to the millbase made with stir-in carbon black. However, the active dispersant/carbon black ratio had to be significantly higher (about 25% wt/wt or 1.3 mg dispersant per square meter of carbon black surface area) for conventional carbon black to disperse and obtain a stable millbase.

TABLE 4

| Raw material | % by weight |
| --- | --- |
| Water | 34.4 |
| AMP-95 | 1.0 |
| Dehydran 1293 (10% active) | 3.0 |
| Petrolite D-1038 (10% active) | 44.0 |
| Sample 6 | 17.6 |
| Total | 100.0 |

The carbon black millbases (from Samples 5 and 6) were then formulated into both acrylic and alkyd waterborne resins. For waterborne acrylic coatings, the acrylic letdown masterbatch formulation in Table 5 was used. To make a final finish black acrylic coating, 5.2 g of carbon black millbase was added slowly to 94.8 g acrylic letdown under good agitation, according to the formulation in Table 6, and mixing was continued for 15 min. Similarly, for the waterborne alkyd coatings, the alkyd letdown was made according to the alkyd masterbatch formulation in Table 7 and the alkyd finish coating was prepared according to the formulation in Table 8.

TABLE 5

| Raw material | % by weight |
| --- | --- |
| Neocryl A-6085 (40% solid acrylic latex) | 80.0 |
| Water | 8.4 |
| Sodium nitrite (25% water) | 1.2 |
| Dehydran 1293 (10% active) | 0.4 |
| Surfynol 104 DPM (wetting agent) | 0.1 |
| BYK346 | 0.1 |
| Dipropylene glycol methyl ether | 2.4 |
| Propylene glycol normal butyl ether | 4.8 |
| Dipropylene glycol normal butyl ether | 2.4 |
| Total | 100.0 |

TABLE 6

| Raw material | % by weight |
| --- | --- |
| Acrylic letdown masterbatch | 94.8 |
| Carbon black millbase | 5.2 |
| Total | 100.0 |

TABLE 7

| Raw material | Amount (g) |
| --- | --- |
| Uradil az-760 (53% solid) | 88.8 |
| Water | 5.4 |
| Dehydran 1293 (10% active) | 0.5 |
| Surfynol 104 DPM | 0.7 |
| BYK 346 | 0.2 |
| Dipropylene glycol methyl ether | 1.8 |
| Propylene glycol normal butyl ether | 2.6 |
| Total | 100.0 |

TABLE 8

| Raw material | % by weight |
| --- | --- |
| Alkyd letdown masterbatch | 95.5 |
| Carbon black millbase | 4.5 |
| Total | 100.0 |

Another modified carbon black (Sample 7) was made using the same methods as those above by treating Elftee® 320 (STSA 62 m$^2$/g) (Cabot Corporation) to a surface concentration of 2.1 µmol/m$^2$ sulfanilic acid. To prepare a stir-in carbon black millbase, Sample 7, water, base (AMP-95), defoamer (Dehydran 1293), and dispersant (Petrolite D-1038) were mixed with a Dispermat® (40 mm diameter Cowles blade) at 500 rpm (tip speed of 1.05 m/s) for 1-2 min (see Table 3). Sample 7 was added while stirring. The mixing rate was then increased to 1,000 rpm and the mixing was continued at 1,000 rpm for 30 min. The millbase contained 17.6% carbon black by weight and the active dispersant/carbon black ratio was about 3% wt/wt or 0.5 mg of dispersant per meter squared of carbon black.

Results—

A tinting study was performed to evaluate the difference between Samples 5 and 6. For the tinting study, a white tint base containing TiO$_2$ was made and then a black finish coating was added to generate a ratio of carbon black to TiO$_2$ solids of 1.3% by weight.

The resulting coatings were drawn down on steel panels with a 3 mil drawdown bar (~1 mil dry film thickness) for color measurement. The color measurement was performed with a Hunter Labscan XE spectrophotometer from HunterLab Inc. For a hiding measurement, the coatings were drawn down on an opacity chart with a 3 mil drawdown bar (~1 mil dry film thickness). The ratio of optical density in the white part of the chart to the optical density in the black part of the chart was calculated to determine the hiding power of each sample. For acrylic coatings, the panels were flashed for 20 min and then baked at 70° C. for 30 min before measurements were taken. Alkyd coatings were air-dried at room temperature for 7 days before measurements were taken.

FIG. 2 shows the hiding of acrylic coatings using a millbase of a conventional untreated carbon black prepared with only a high speed mixer according to the formulation shown in Table 1. It is clear that the untreated carbon black did not disperse properly with the high speed mixer, as large carbon black chunks were observed. Consequently the film did not achieve its color potential. When conventional treatment levels (greater than 3.3 µmol/m$^2$) were used, the treated carbon blacks were readily dispersible in water. However, when the liquid coatings were dried, the conventionally treated carbon back with excessive hydrophilic groups was not compatible with the waterborne resin, leading to large areas of film without carbon black, thus hurting its color performance, as shown in FIG. 1, last panel. Only when the treatment level was below 3.3 µmol/m$^2$, was the treated carbon black readily dispersible in water and compatible with waterborne coating resins after the coating was dried. Consequently, a dark black film with excellent hiding was obtained as shown in FIG. 1, first two panels.

FIGS. 7A and 7B show the comparison of color performance of Sample 5 and Black Pearls 800 having identical morphology in masstone (A) and tint (B) formulations in the acrylic coating. It is clear that in both masstone and tint formulations, Sample 5 provides lower L* compared to the conventional carbon black (Black Pearls 800), indicating higher jetness in the masstone formulation and higher tint strength in the tint formulation. The same benefit was seen when Sample 5 was formulated into alkyd coatings as shown in FIGS. 7C and 7D. It was also observed that in masstone formulations Sample 5 gave coatings with bluer undertone (lower b value), which is frequently indicative of a finer degree of carbon black dispersion. Moreover, with Sample 5, these color performance advantages were achieved using only a Dispermat® mixer to make the carbon black millbase without a milling step. Furthermore, Sample 5 required only about 0.157 mg active dispersant per square meter of carbon black surface area while the conventional carbon black required 1.3 mg active dispersant per square meter of carbon black surface area. The use of excessive dispersant not only imposes a significant cost for coating or millbase makers, but also makes the finish coatings more hydrophilic due to the migration of dispersant to the coating surface, compromising the coating's durability and weatherability.

The same information regarding masstone and tint for Sample 2 and untreated Regal 330R is provided in FIGS. 8A-8D. As stated above for Sample 5, the experimental Sample 2 provided lower L* compared to the conventional carbon black (Regal 330R), indicating higher jetness in the masstone formulation and higher tint strength in the tint formulation. Similarly, Sample 2 provided similar improvements in the alkyd coatings as well.

FIGS. 9A-9D provide corresponding data for Sample 7 and the untreated Elftex 320 carbon black. Sample 7 provided lower L* compared to the conventional carbon black (Elftex 320), indicating higher jetness in the masstone formulation and higher tint strength in the tint formulation. Sample 7 also provided similar improvements in the alkyd coatings as shown in FIGS. 9C and 9D. Thus, each of samples 5, 2 and 7 were demonstrated to provide improved jetness and tint when compared to the untreated carbon blacks from which each of the samples was made. This held true even at lower levels of dispersant and in two different coating types, acrylic and alkyd coatings.

To examine the dispersion level of each of the carbon black samples a cross-sectional transmission electron microscope (TEM) study was completed. The coatings on opacity charts were microtomed with a PowerTome PC (Boeckeler) and thin slices were picked up on copper grids for TEM examination with a JEM1200 (JEOL) at an accelerating voltage of 80,000 V. In FIGS. 10A and 10B the magnification is 2000×. FIG. 10A shows the distribution of Sample 5 in the acrylic coating. It was seen that fine carbon black particles were well distributed in the coating polymer matrix; the size appeared close to the ~100-200 nm fundamental aggregate size. This indicates that the carbon black millbase containing Sample 5 made with only a Dispermat® was very well deagglomerated, confirming stir-in mixing conditions were sufficient to disperse Sample 5 to nearly aggregate level. FIG. 10B shows the distribution of Black Pearls 800 with identical morphology as Sample 5 in the acrylic coating. The Black Pearls 800 millbase was obtained first by a premix step with a Dispermat® followed by a milling step using a horizontal mill. As is apparent in FIG. 10B, even with horizontal milling and a much higher dispersant loading (1.3 vs. 0.157 mg dispersant per square meter of carbon black surface area), deagglomeration of conventional carbon black to the fundamental aggregate level was difficult to achieve, and some level of particle agglomeration persisted in the final coating. The dispersant type used for Sample 5 and for the Black Pearls 800 was the same.

To demonstrate dispersibility at higher concentrations, a carbon black millbase with 30% Sample 5 without any dispersant was made with a Dispermat® at 1000 rpm for 30 min. The resulting millbase was fluid. In another example, Sample 2 was used to make a stir-in millbase with 35.5% carbon black loading in the presence of 3% dispersant using a Dispermat® at 1000 rpm for 30 min. The resulting millbase had viscosity around 600 cP at low shear and exhibited shear-thinning behavior as shown in FIG. 11. In contrast, for the untreated Regal 330R with identical morphology as Sample 2, a horizontal mill was required to make a millbase, and the maximum carbon black loading in the millbase was found to be ~20%, above which the millbase was too viscous to pass through the horizontal mill. At this solid loading (>20% by weight), the premix viscosity was similar to that of Sample 2 millbase (not premix) with 35.5% loading as shown in FIG. 11. The higher carbon black millbase concentration enabled by stir-in carbon blacks disclosed herein gives formulation flexibility to coating formulators and also enables millbase makers to ship less water in their products.

To illustrate the importance of choosing the correct carbon black treatment level and dispersant concentration, a series of millbases were made with very similar compositions but with slight variations in treatment level and/or dispersant concentration. Unless otherwise described, the stir-in dispersions made from the modified carbon blacks described herein were made using the following procedure. The modified carbon blacks were dispersed using a Dispermat® CV3+ mixer (VMA-GETZMANN GMBH) with a 40 mm Cowles blade and a stainless steel mixing vessel. The geometry was configured as recommended by the manufacturer. The following example provides the details for producing a 200 g dispersion of 30% modified carbon black by weight and 0.185 mg of dispersant per square meter of carbon black surface area (STSA). The specific modified carbon black and the dispersant concentration were adjusted in subsequent runs to produce the millbases provided in Table 9. The sample millbases contained 40% modified carbon black by weight except samples 8A, 8B, 13 and 14 (30% by weight) and samples 15 and 16 (10% by weight) as these samples were undispersible at 40% with any amount of dispersant. Samples 8A through 14 were made using Regal® 660R (STSA of 121 m$^2$/g and DBP of 65) as the base carbon black. Sample 15 had an STSA of 370 m$^2$/g prior to treatment and a DBP structure of 100 cm$^3$/g. Sample 16 had an STSA of 325 m$^2$/g and a DBP structure of 100 cm$^3$/g. The base carbon blacks for samples 15 and 16 were produced according to the method described in U.S. Pat. No. RE28,974 and were treated with sulfanilic acid as described in U.S. Pat. No. 5,707,432. Both of these patents are incorporated by reference herein.

111.6 g of water (132 g for 8A, 8B, 13 and 14; 169.5 g for 15 and 16), 6.0 g Dehydran® 1293 (defoamer), 0.5 g AMP-95 (pH adjuster) and 1.94 g Disperbyk® 192 dispersant (1.45 g for 8A, 8B, 13 and 14; 4.0 g for 15 and 16) were added to a 600 mL stainless steel beaker having a 90 mm inner diameter. The beaker was placed on the Dispermat and the 40 mm blade was adjusted to a height of 15 mm to allow liquid to completely cover the blade. The contents were then mixed together for one to two minutes at 1000 rpm. 80 g (60 g for 8A, 8B, 13 and 14) of dry modified carbon black powder treated with sulfanilic acid were weighed into a separate container and slowly added to the aqueous mixture over the course of 60 seconds. A visual inspection was made to confirm that all of the modified carbon black was wetted. The Cowles blade was then adjusted to a height of 20 mm and the speed was set to 2000 rpm, equivalent to a blade tip speed of 4.2 m/s. The mixer was operated at 2000 rpm for a period of 30 minutes to produce the aqueous dispersion of modified carbon black. For Sample 8B, the mixer was operated at 4000 rpm instead of 2000 rpm for the 30 minute period.

Treatment level, dispersant level and particle size distribution for each of the samples are provided in Table 9. Attempts were made to produce additional millbase samples using modified carbon blacks with treatment levels of 4, 5 and 6 μmol/m$^2$, but the samples were not further evaluated. In addition, a modified carbon black at a treatment level of 1 μmol/m$^2$ with 0.2 mg of dispersant (Disperbyk 192) could not be made into a useable millbase dispersion at 30% carbon black by weight as it did not wet out. Particle size distributions were determined using a Horiba LA-950V2 particle sizing instrument available from Horiba Scientific. For particle size determination, each dispersion was diluted with pH 10.5 water to a solids concentration of about 0.1% by weight. Volume weighted agglomerate size distribution plots were generated by running each sample in duplicate. Table 9 provides the median, mode, D10 and D90 of the particle size distribution for each of the dispersions. D90 in particular is considered to be a good indicator of how well a carbon black is dispersed and is provided on a volume weighted basis. The surface area value for determining treatment level and dispersant level is the STSA of the unmodified carbon black. Each analysis was run in duplicate. Sample 13 exhibited a bimodal distribution with a small second mode at about 2 μm, and sample 16 exhibited a bimodal distribution with two modes at 1 μm and 100 μm. Samples 15 and 16 were not dispersible at 30% by weight and at 10% dispersion, large particles were observed. This means that these carbon blacks are not suitable for use in stir-in millbases at greater than 30% carbon black and that carbon blacks with high surface areas (STSA) of greater than 300 m$^2$/g are unsuitable for this use.

TABLE 9

| Sample ID | Treatment Level μmol/m$^2$ | Dispersant Level (active) mg/m$^2$ | D50 (median) μm | Mode μm | D10 μm | D90 μm |
|---|---|---|---|---|---|---|
| 8A run 1 | 1.0 | 2.4 | 0.182 | 0.185 | 0.102 | 0.307 |
| 8A run 2 | 1.0 | 2.4 | 0.183 | 0.185 | 0.102 | 0.309 |
| 8B run 1 | 1.0 | 2.4 | 0.103 | 0.106 | 0.070 | 0.153 |
| 8B run 2 | 1.0 | 2.4 | 0.103 | 0.106 | 0.070 | 0.153 |
| 9 run 1 | 1.84 | 0.2 | 0.195 | 0.185 | 0.100 | 0.446 |
| 9 run 2 | 1.84 | 0.2 | 0.195 | 0.185 | 0.100 | 0.425 |
| 10 run 1 | 1.84 | 0.5 | 0.118 | 0.122 | 0.077 | 0.181 |
| 10 run 2 | 1.84 | 0.5 | 0.115 | 0.122 | 0.075 | 0.177 |
| 11 run 1 | 1.84 | 1.7 | 0.105 | 0.107 | 0.071 | 0.158 |
| 11 run 2 | 1.84 | 1.7 | 0.105 | 0.107 | 0.071 | 0.158 |
| 12 run 1 | 1.84 | 2.4 | 0.102 | 0.094 | 0.070 | 0.152 |
| 12 run 2 | 1.84 | 2.4 | 0.102 | 0.094 | 0.070 | 0.151 |
| 13 run 1 | 3.5 | 0.2 | 0.125 | 0.122 | 0.076 | 0.732 |
| 13 run 2 | 3.5 | 0.2 | 0.125 | 0.122 | 0.076 | 0.788 |
| 14 run 1 | 3.5 | 2.4 | 0.103 | 0.107 | 0.070 | 0.156 |
| 14 run 2 | 3.5 | 2.4 | 0.104 | 0.107 | 0.070 | 0.156 |
| 15 run 1 | 2.2 | 0.5 | 0.794 | 0.819 | 0.362 | 1.796 |
| 15 run 2 | 2.2 | 0.5 | 0.796 | 0.819 | 0.362 | 1.800 |
| 16 run 1 | 1.6 | 0.6 | 28.234 | 1.067 | 0.920 | 115.572 |
| 16 run 2 | 1.6 | 0.6 | 27.903 | 1.066 | 0.914 | 115.277 |

Table 10, below, provides additional data for the same dispersions as produced in Table 9. In addition to D90, the table provides viscosity data for each of the samples for each of the millbases for which viscosity could be tested. Each sample was tested using the Brookfield DV-II+ viscometer and the method described herein. Each sample was evaluated and viscosities recorded at 10, 20, 50 and 100 rpm. There was no direct correlation between dispersant concentration and relative viscosity.

TABLE 10

| Sample No. | % Carbon Black by weight | Treatment Level μmol/m² | Dispersant Level (active) mg/m² | D90 Particle Size μm | Viscosity (cP) | | | |
|---|---|---|---|---|---|---|---|---|
| | | | | | 10 rpm | 20 rpm | 50 rpm | 100 rpm |
| 8B | 30 | 1 | 2.4 | 0.153 | 3484 | 2232 | 1302 | 843 |
| 9 | 40 | 1.84 | 0.2 | 0.436 | 9263 | 4861 | 2083 | 1141 |
| 10 | 40 | 1.84 | 0.5 | 0.179 | 361 | 311 | 253 | 202 |
| 11 | 40 | 1.84 | 1.7 | 0.158 | 1069 | 744 | 454 | 315 |
| 12 | 40 | 1.84 | 2.4 | 0.152 | 6386 | 3732 | 1885 | 1141 |
| 13 | 30 | 3.5 | 0.2 | 0.760 | 298 | 174 | 98.0 | 62 |
| 14 | 30 | 3.5 | 2.4 | 0.156 | 4216 | 1972 | 856 | 484 |

The samples were let down to determine their hiding power, color and hue properties when applied as a finished coating. Jetness (L*), blue/yellow undertone (b*) and red/green undertone (a*) were measured for a 0.0762 mm wet thickness films (WTF) using a Hunter Lab Scan XE spectrophotometer and are reported in Table 11 below. Hiding power was evaluated for 0.0762 mm wet thickness films (WTF) by using a BYK Opacity Chart #2813 with half black and half white. The hiding power of the coating was determined using an X-rite® Exact densitometer and is also reported in Table 11. Because of their inability to disperse, samples 15 and 16 were deemed unsuitable for use in an aqueous coating millbase and therefore color and hiding data for these samples has not been provided. The samples showing good hiding power (≥0.99) and low viscosity (Table 10) were those samples having a relatively low combination of treatment level and dispersant loading in the millbase. Conversely, those samples including high treatment levels and/or high levels of dispersant were not optimal for at least one of hiding power, color, viscosity or particle size. In the aggregate, these data indicate that some of the best results are actually obtained in dispersions that include a relatively low treatment level, e.g., less than 3 μmol/m², as well as a low level of dispersant, e.g., less than or equal to 2.4 mg per square meter of carbon black surface area. Thus, an effective stir-in millbase or liquid coating dispersion can be produced at a low loading of organic treatment and reduced levels of dispersant.

TABLE 11

| Sample | Dispersant wt % | L* | a* | b* | Hiding Power @ WFT of 0.0762 mm |
|---|---|---|---|---|---|
| 8A | 29 | 2.55 | 0.37 | 0.51 | 0.99 |
| 8B | 29 | 2.72 | 0.41 | 0.64 | 1.00 |
| 9 | 2.5 | 2.13 | 0.28 | 0.18 | 0.97 |
| 10 | 6.0 | NA | NA | NA | 1.00 |
| 11 | 20 | 2.11 | 0.26 | 0.16 | 1.00 |
| 12 | 29 | 2.08 | 0.27 | 0.21 | 0.99 |
| 13 | 2.5 | 1.79 | 0.1 | −0.01 | 0.95 |
| 14 | 29 | 1.88 | 0.13 | 0.03 | 0.98 |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A carbon black millbase dispersion comprising:
   an aqueous solvent comprising greater than 90% water by weight;
   at least 30% by weight of a modified carbon black, the modified carbon black having an STSA between 20 and 300 m²/g as measured prior to treatment, the modified carbon black modified with a treating agent comprising an organic group and an ionic or ionizable group at a treating agent concentration of between 1.0 and 3.0 μmol/m²;
   a dispersant concentration of less than 2.4 mg per square meter of carbon black surface area as measured by STSA prior to treatment; and wherein less than 10% by volume of the modified carbon black dispersed in the millbase has a particle size of greater than 0.5 µm.

2. A carbon black millbase dispersion comprising:
an aqueous solvent comprising at least 90% water by weight;
greater than 30% modified carbon black by weight, the modified carbon black treated with an organic treatment compound at a treatment level of between 1 and 3.0 µmol/m$^2$, the organic treatment compound comprising both an aryl group and an ionic or ionizable group, the modified carbon black made from an untreated carbon black having an STSA of greater than 20 m$^2$/g and less than 300 m$^2$/g;
less than or equal to 2.4 mg of dispersant per square meter of carbon black surface area; and
wherein the carbon black millbase dispersion remains stably dispersed after one week at 52° C.

3. A carbon black millbase dispersion comprising greater than or equal to 30% of a modified carbon black and less than 2.4 mg of dispersant per square meter of carbon black surface area, the modified carbon black treated with a treating agent at a level of less than or equal to 2.0 µmol/m$^2$, the millbase comprising an aqueous solvent that includes at least 90% water, and wherein the sum of the treatment level in µmol/m$^2$ and the dispersant level in mg/m$^2$ is greater than or equal to 2.5.

4. The millbase dispersion of claim 1 wherein when tested using Aqueous Coatings Evaluation Method A, the resulting cured coating exhibits a hiding power of greater than or equal to 0.98 at a wet film thickness of about 0.076 mm.

5. The millbase dispersion of claim 1 wherein the modified carbon black has an average primary particle size of from 15-50 nm.

6. The millbase dispersion of claim 1 wherein the organic group of the treating agent comprises an arylene group.

7. The millbase dispersion of claim 1 wherein the treating agent comprises a sulfonic acid group or salts thereof, a benzoic acid group or salts thereof, a carboxylic acid group or salts thereof or a phosphonic acid group or salts thereof.

8. The millbase dispersion of claim 1 wherein the dispersant is a nonionic dispersant.

9. An aqueous coating dispersion made from the millbase of claim 1 wherein the aqueous coating dispersion further comprises an aqueous alkyd or acrylic resin.

10. The millbase dispersion of claim 1 wherein the treating agent is directly attached to the carbon black.

11. An aqueous coating produced by letting down the millbase dispersion of claim 1 to a modified carbon black concentration of between 0.01 and 5% by weight.

12. The millbase dispersion of claim 1 wherein the millbase dispersion exhibits a Brookfield viscosity of less than 1100 cP at 10 rpm and 25° C.

13. A method of making a stable aqueous liquid coating, the method comprising:
mixing undispersed modified carbon black powder into an aqueous coating letdown vehicle comprising an aqueous solvent comprising at least 90% water by weight at a carbon black loading of greater than 0.01% by weight and less than 5% by weight of the stable aqueous liquid coating, the modified carbon black treated at a level of between 1.0 and 3.0 µmol/m$^2$, the stable aqueous liquid coating having a dispersant concentration of less than 2.4 mg per square meter of carbon black surface area; and
wherein the aqueous liquid coating exhibits a hiding power of greater than or equal to 0.97 at a wet film thickness of 0.0762 mm and wherein the undispersed modified carbon black powder is capable of being dispersed by stirring the modified carbon black into the aqueous coating letdown vehicle while not exceeding a blade tip speed of 4 m/s.

14. The method of claim 13 wherein the modified carbon black is treated at a level of less than 1.925 µmol/m$^2$.

15. The method of claim 13 wherein the dispersant concentration is less than or equal to 1.7 mg per square meter of carbon black surface area.

16. The method of claim 13 wherein the hiding power is greater than or equal to 0.98 or 0.99.

17. A method of making an aqueous millbase dispersion, the method comprising:
stirring an undispersed modified carbon black dry powder free from milling media into an aqueous vehicle at a concentration of at least 30% by weight, based on the final weight of the millbase, to form a carbon black millbase, the modified carbon black treated with a treating agent at a loading between 1.0 and 3.0 µmol/m$^2$, the treating agent comprising an aryl group and an ionic or ionizable group, the aqueous vehicle comprising a solvent that includes greater than 90% water by weight and less than 2.4 mg of dispersant per square meter of carbon black surface area, and
wherein less than 10% by volume of the modified carbon black dispersed in the millbase has a particle size of greater than 0.5 µm.

18. The method of claim 13 wherein fewer than 10% by volume of the modified carbon black particles dispersed in the millbase have a particle size of greater than 0.4 µm.

19. The method of claim 17 wherein the modified carbon black is dispersed at a concentration of 40% by weight or more.

20. The method of claim 17 wherein the dispersant is at a concentration of less than 1.7 mg of dispersant per square meter of carbon black surface area.

21. The method of claim 13 wherein the modified carbon black powder is a dry powder that does not include milling media.

22. An aqueous coating produced by letting down the millbase dispersion of claim 2 to a modified carbon black concentration of between 0.01 and 5% by weight.

23. An aqueous coating produced by letting down the millbase dispersion of claim 3 to a modified carbon black concentration of between 0.01 and 5% by weight.

* * * * *